(12) United States Patent
Moss et al.

(10) Patent No.: US 9,229,809 B2
(45) Date of Patent: Jan. 5, 2016

(54) NONVOLATILE MEDIA JOURNALING OF VERIFIED DATA SETS

(75) Inventors: Darren Moss, Redmond, WA (US); Karan Mehra, Sammamish, WA (US); Rajeev Nagar, Sammamish, WA (US); Surendra Verma, Bellevue, WA (US); Shiv Rajpal, Sammamish, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 13/229,736

(22) Filed: Sep. 11, 2011

(65) Prior Publication Data

US 2013/0067174 A1 Mar. 14, 2013

(51) Int. Cl.
G06F 12/16 (2006.01)
G06F 11/10 (2006.01)
G06F 11/14 (2006.01)
G06F 3/06 (2006.01)

(52) U.S. Cl.
CPC ........ *G06F 11/1076* (2013.01); *G06F 11/1471* (2013.01); *G06F 3/0613* (2013.01); *G06F 3/0646* (2013.01)

(58) Field of Classification Search
CPC .. G06F 3/0613; G06F 3/0646; G06F 11/1471
USPC ......................................... 711/154, 158, 162
See application file for complete search history.

(56) References Cited

U.S. PATENT DOCUMENTS

| | | |
|---|---|---|
| 5,537,636 A | 7/1996 | Uchida et al. |
| 5,848,038 A | 12/1998 | Igorashi |
| 6,799,244 B2 | 9/2004 | Tanaka et al. |
| 7,035,974 B2 | 4/2006 | Shang |
| 7,162,401 B1 | 1/2007 | Abeles |
| 7,392,357 B2 | 6/2008 | Ebata |

(Continued)

FOREIGN PATENT DOCUMENTS

| | | |
|---|---|---|
| CN | 102937882 A | 2/2013 |
| CN | 102945201 A | 2/2013 |

(Continued)

OTHER PUBLICATIONS

Reply Non-Final Office Action cited in U.S. Appl. No. 13/230,840 dated Jan. 17, 2013, 13 pgs.

(Continued)

*Primary Examiner* — Than Nguyen
(74) *Attorney, Agent, or Firm* — Sunah Lee; Kate Drakos; Micky Minhas

(57) ABSTRACT

The storage of data sets in a storage set (e.g., data sets written to hard disk drives comprising a RAID array) may diminish the performance of the storage set through non-sequential writes, particularly if the storage devices promptly write data sets that are followed by sequentially following data sets. Additionally, storage sets may exhibit inconsistencies due to non-atomic writes of data sets and verifiers (e.g., checksums) and an intervening failure, such as an occurrence of the RAID write hole. Instead, data sets and verifiers may first be written to a stored on the nonvolatile media of a storage device before being committed to the storage set. Such writes may be sequentially written to the journal, irrespective of the locations of the data sets in the storage set; and recovery of a failure may simply involve re-committing the consistent records in the journal to correct incomplete writes to the storage set.

20 Claims, 11 Drawing Sheets

(56) References Cited

U.S. PATENT DOCUMENTS

| | | | |
|---|---|---|---|
| 7,457,928 | B2 | 11/2008 | Evanchik et al. |
| 7,486,593 | B2 | 2/2009 | Arai |
| 7,562,188 | B2 | 7/2009 | Cavallo |
| 7,574,560 | B2 | 8/2009 | MacHardy et al. |
| 7,607,034 | B2 | 10/2009 | Yasuhara |
| 7,675,828 | B2 | 3/2010 | Park et al. |
| 7,774,346 | B2 | 8/2010 | Hu et al. |
| 7,873,782 | B2 | 1/2011 | Terry et al. |
| 8,036,079 | B2 | 10/2011 | Kuraoka et al. |
| 8,121,007 | B2 | 2/2012 | Nagar et al. |
| 8,271,753 | B2 | 9/2012 | Nemoto et al. |
| 2005/0034012 | A1 | 2/2005 | Bartlett et al. |
| 2005/0071593 | A1 | 3/2005 | Vincent |
| 2005/0144381 | A1* | 6/2005 | Corrado .................. 711/114 |
| 2007/0028045 | A1 | 2/2007 | Hung |
| 2007/0055909 | A1 | 3/2007 | Smith et al. |
| 2007/0136810 | A1* | 6/2007 | Waltermann et al. ........... 726/24 |
| 2007/0174580 | A1* | 7/2007 | Shulga ...................... 711/170 |
| 2008/0046667 | A1* | 2/2008 | Fachan et al. .............. 711/154 |
| 2008/0222214 | A1 | 9/2008 | Tokuda et al. |
| 2009/0024791 | A1 | 1/2009 | Lee et al. |
| 2009/0106334 | A1* | 4/2009 | Day .......................... 707/205 |
| 2009/0172273 | A1 | 7/2009 | Peszczek et al. |
| 2010/0138603 | A1 | 6/2010 | Mukker |
| 2011/0035549 | A1 | 2/2011 | Baek |
| 2013/0067174 | A1 | 3/2013 | Moss et al. |

FOREIGN PATENT DOCUMENTS

| | | |
|---|---|---|
| JP | 06-259198 A | 9/1994 |
| JP | 2000-305860 A | 11/2000 |
| JP | 2001051806 A | 2/2001 |
| JP | 2002-323959 A | 11/2002 |
| JP | 2003-196032 A | 7/2003 |

OTHER PUBLICATIONS

Notice of Allowance cited in U.S. Appl. No. 13/230,840 dated Jan. 17, 2013, 12 pgs.
Int. Search Report cited in PCT Application No. PCT/US2012/054887 dated Feb. 20, 2013, 10 pgs.
Wan, et al., "S2-RAID: A New RAID Architecture for Fast Data Recovery", Retrieved at <<http://storageconference.org/2010/Papers/MSST/Wan.pdf>>, 2010, pp. 9.
Alvarez, et al., "Tolerating Multiple Failures in RAID Architectures with Optimal Storage and Uniform Declustering", Retrieved at <<http://ieeexplore.ieee.org/stamp/stamp.jsp?arnumber=00604535>>,Jun. 2, 1997, pp. 62-72.
"Characteristics of Linux RAID Levels", Retrieved at <<http://tldp.org/LDP/EVMSUG/html/characraidlvls.html>>, Retrieved Date: Mar. 9, 2011, pp. 4.
Sue, Jeff, "How RAID Storage Improves Performance", Retrieved at <<http://www.suite101.com/content/how-raid-storage-improves-performance-a101975>>, Mar. 12, 2009, pp. 15.
"Improving RAID Storage Systems with Non-Volatile Write Journals", Retrieved at <<http://www.rtcmagazine.com/articles/view/101528>>,Retrieved Date: Mar. 8, 2011, pp. 5.
"VERITAS Storage Foundation 4.0", Retrieved at <<http://download.oracle.com/docs/cd/E19904-01/875-3632-10/875-3632-10.pdf>>, 2004, pp. 20.
"HP Battery Backed Write Cache Enabler (Enables RAID 5)", Retrieved at <<http://web.techbuy.com.au/p/84480/SYSTEMS_HP_ACCESSORIES/HP/351580-B21.asp>>, Retrieved Date : Mar. 9, 2011, p. 1.
Int. Search Report cited in PCT Application No. PCT/US2011/055818 dated Sep. 28, 2012, 8 pgs.
Non-Final Office Action cited in U.S. Appl. No. 13/230,840 dated Oct. 17, 2012, 10 pgs.
"RAID-Z", Jeff Bonwick, Nov. 17, 2005, reprinted from the Internet at: http://blogs.oracle.com/bonwick/entry/raid_z, 6 pgs.
Int. Preliminary Report cited in PCT Application No. PCT/US2011/055818 dated Mar. 12, 2014, 4 pgs.
Int. Preliminary Report cited in PCT Application No. PCT/US2012/054887 dated Mar. 12, 2014, 5 pgs.
Non-Final Office Action cited in U.S. Appl. No. 13/906,778 dated Oct. 2, 2013, 9 pgs.
Non-Final Office Action cited in U.S. Appl. No. 13/906,821 dated Nov. 20, 2013, 9 pgs.
Reply Non-Final Office Action cited in U.S. Appl. No. 13/906,778 dated Aug. 12, 2014, 12 pgs.
Reply Non-Final Office Action cited in U.S. Appl. No. 13/906,821 dated Aug. 12, 2014, 15 pgs.
Notice of Allowance cited in U.S. Appl. No. 13/906,821 dated Sep. 2, 2014, 10 pgs.
1st Chinese Office action, dated Oct. 10, 2014, 10 pages.
1st Chinese Search report dated Sep. 18, 2014, 2 pages.
Translation of 1st Chinese Office action dated Oct. 10, 2014, 4 pages.
Second Chinese Office Action cited in Chinese Application No. 201210333854.2 dated Jun. 30, 2015, 3 pgs.
Partial EP Search Report cited in EP Application No. 11872055.6 dated Jul. 7, 2015, 7 pgs.
Reply Chinese Office Action cited in Chinese Application No. 212103338564.2 dated Feb. 15, 2015, 5 pgs.
"Office Action Issued in Japanese Patent Application No. 2014-529692", Mailed Date: Aug. 4, 2015, 4 Pages.
"Search Report Issued in European Patent Application No. 11872055.6", Mailed Date: Oct. 26, 2015, 10 Pages.
Reply/Claims second Chinese Office Action cited in Chinese Application No. 201210333854.2 dated Sep. 11, 2015, 5 pgs.
Chinese Notice to Grant Patent Right cited in Chinese Application No. 201210333854.2 dated Nov. 20, 2015, 2 pgs.
Reply/Claims Japanese Office Action cited in Japanese Application No. 2014-529692 dated Nov. 8, 2015, 7 pgs.

* cited by examiner

NONVOLATILE MEDIA JOURNALING OF VERIFIED DATA SETS

BACKGROUND

Within the field of computing, many scenarios involve the storage of data on one or more nonvolatile storage devices (e.g., platter-based magnetic and/or optical hard disk drives, solid-state storage devices, and nonvolatile memory circuits). Many details of the data storage may vary, such as the word size, the addressing method, the partitioning of the storage space of the storage device into one or more partitions, and the exposure of allocated spaces within the storage device as one or more volumes within a computing environment.

In many such storage scenarios, techniques may be utilized to detect unintended changes to the data. For example, an error in the reading or storing logic of the device, a buffer underrun or overrun, a flaw in the storage medium, or an external disruption (such as a cosmic ray) may occasionally cause an inadvertent change in the data stored on the storage medium or in the reading of data from the storage medium. Therefore, in many such scenarios, the data is stored on the storage devices according to an error detection scheme involving a verifier (e.g., a parity bit or checksum) computed for respective data sets (e.g., different words, sectors, regions, or other sets of data). The verifier may be used to confirm that the contents of the data set have been validly stored to and/or read from the storage device. As one such example, in the context of storing a data set comprising a set of bits, an exclusive OR (XOR) operation may be applied to the bits, resulting in a parity bit that may be stored and associated with this data set. When the data set is later read, another XOR operation may be applied thereto, and the result may be compared with the parity bit. A change of any one bit results in a mismatch of these XOR computations, indicating that the data has been incorrectly stored, altered, or incorrectly read from the storage device. Many types of verifiers may be identified, which may vary in some features (e.g., ease of computation, a capability of identifying which bit of the data set has changed, and an error-correction capability whereby an incorrectly read portion of data may be corrected).

Error detection schemes are often utilized in Redundant Array of Inexpensive Disks (RAID) arrays, such as a set of hard disk drives that are pooled together to achieve various aggregate properties, such as improved throughput and automatic data mirroring. As one such example, a RAID 4 array involves a set of two or more disks, where one disk is included in the array not to store user data, but to store verifiers of the data stored on the other disks. For example, for a RAID 4 array involving four disks each storing one terabyte of data, the capacity of the first three disks is pooled to form a three-terabyte storage space for user data, while the fourth disk is included in the array to hold verifiers for data sets stored on the first three disks (e.g., for every three 64-bit words respectively stored on the other three disks, the fourth disk includes a 64-bit verifier that verifies the integrity of the three 64-bit words). The RAID array controller comprises circuitry that is configured to implement the details of a selected RAID level for a provided set of drives (e.g., upon receiving a data set, automatically apportioning the data across the three user data disks, calculating the verifier of the data set, and storing the verifier on the fourth disk). The RAID techniques used may also enable additional protections or features; e.g., if any single storage device in a RAID 4 array fails, the data stored on the failed device may be entirely reconstructed through the use of the remaining storage devices.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The writing of data to a storage device may present several sources of inefficiency and potential problems. As a first example, a data set written to a storage device may involve a sequence of data, such as data written to a sequence of physical addresses on a storage device. By writing the data set in accordance with this sequence (e.g., as a sequential write of a contiguous block of data), the storage device may achieve faster seek times, higher throughput, and/or reduced power consumption and physical wear due to the reduction of seek times and write operations. However, due to various circumstances, a storage device may write the sequence of data as two or more sub-sequences and may fail to achieve these efficiencies. As a first example, the request to write the data set may comprise two or more requests to write a portion of the sequence (e.g., a first request to write addresses 1,000-1, 015 and a second request to write addresses 1,016 to 1,031), and the storage device may separately commit each portion of the sequence, rather than committing the entire sequence together. As a second example, the storage device may receive several write requests, and between writing a first portion of the sequence and a second portion of the sequence, may store a different data set at a different location, thereby causing two additional seeks between the first portion and the second portion. These and other circumstances may be identified as missed opportunities for efficiency gains in the performance, power efficiency, and longevity of the storage device.

A second problem that may arise while storing verifier-based storage sets involves the delay between storing a data set and its verifier (or vice versa). As a first example, many storage devices only support a write to one location at a time (e.g., the location underneath the write head of a hard disk drive, or the location specified by an address register in a solid-state storage device), and the sequential storing of data involves writing the data set before the verifier, or vice versa. As a second example, if the data set and verifier are stored on different storage devices, it may be difficult to synchronize the moment that the first storage device stores the data set with the moment that the second storage device stores the verifier of the data set. In these and other examples, storing a data set and a corresponding verifier may occur not a synchronous manner, but in a sequential manner. However, a failure of the storage device(s), such as power loss, a hardware failure, a software crash, or an unanticipated removal of a storage device from the array, may occur after storing a data set and before storing the verifier. Consequently, the verifier does not match the data represented by the verifier. This problem caused by non-atomic writes, sometimes identified as the RAID write hole, may manifest in many resulting consequences. For example, it may be difficult for the storage device(s) to determine how to remedy this error, e.g., whether the mismatch represents an incorrect verifier, an unintended change to the data set (e.g., a manifestation of the bit error rate (BER) of the storage set), or an incorrect read of either the data set or the verifier. This lack of information may even jeopardize the confidence in the accuracy of a portion of the data set that have not recently been written. For example, if one of the storage devices fails, an attempt to recover the data on the storage device from the remaining storage devices (using the incorrect verifier) may result in incorrect data reconstruction. For instance, in order to recover data from a particular volume that has been lost or corrupted and substituted with a repaired or replacement storage device, each word of data on the missing storage devices may be computed by XORing together the words at the same location (e.g., the same physical or logical address on the other devices) and the checksum for the set of words at the address, and the result yields the missing word. However, if the checksum has inadvertently changed, the XOR operation results in an incorrect result and the replacement of the word on the substituted volume with incorrect data. As another example, if a verifier C is stored for a data set comprising portions A and B, and a catastrophic failure arises while updating A and C, the computer may be able to identify a mismatch between the data set [A, B] and verifier C. This inability may undermine the confidence not only in A and C, which were participating in the writing at the moment of catastrophic failure, but also B, which may not even have been accessed in a long time.

Presented herein are techniques for reducing the risks of data loss and the protracted recovery time caused by problems such as the RAID write hole, as well as improving the efficiency of the storage set. In accordance with these techniques, on one or more storage devices of the storage set, a journal may be generated that is configured to store data sets that are to be committed to the storage set. The journal may comprise, e.g., a sequence of records structured as a loop array, where each record has capacity to store a data set and a verifier computed for the data set. All data sets to be written to the storage set may first be stored in the journal, in sequential order of receipt, along with a verifier computed for the data set.

These techniques may reduce the consequences of the RAID write hole by providing a mechanism whereby nonatomic writes may be stored on the nonvolatile memory of a storage device before being committed to the location in the storage set. If a failure occurs while the data set is being written to the journal, the version of the data set stored in the storage set remains intact; and if a failure occurs while the data set is being written to the storage set, the failure may be recovered by reinitiating the write of the data set from the journal to the storage set. Additionally, the use of a journal may improve the performance of the storage device by promoting sequential writes. As a first example, non-sequential data sets are first written sequentially to the journal, providing rapid, sequential write throughout even for non-sequential data sets. As a second example, the journal may operate as a write buffer between the write requests and the storage set, thereby enabling a coalescence of write requests comprising a sequence of data stored in contiguous physical locations of the storage device. Still further performance improvements may be achieved, e.g., by generating a volatile memory representation of the journal stored on the nonvolatile storage device, where the volatile memory representation serves as a reach cache and/or a write buffer. These and other advantages may be achievable through the use of the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
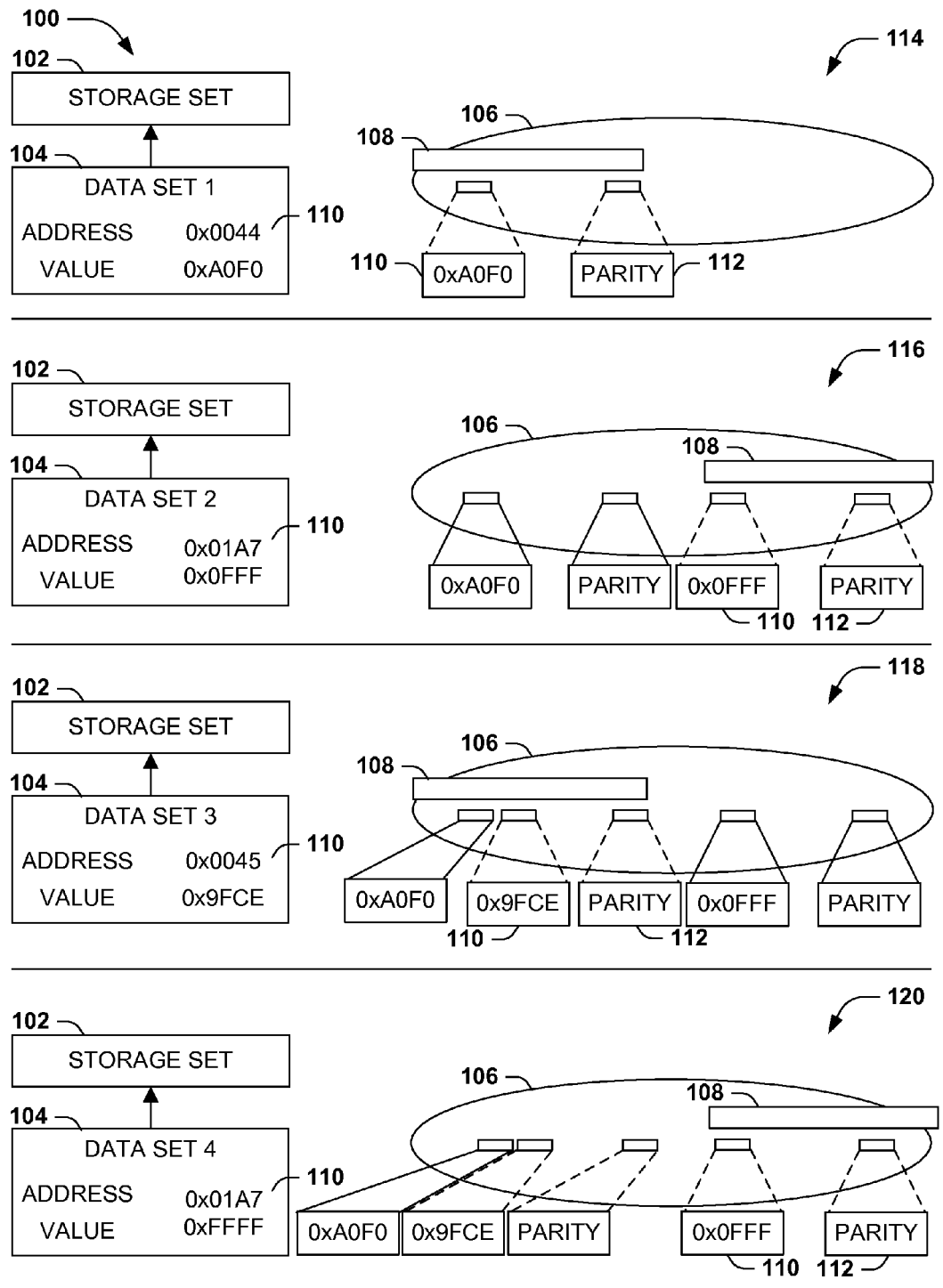
FIG. 1 presents an illustration of an exemplary storage of data sets comprising a storage set on a storage device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve the storage of a storage set, comprising a series of data sets, on a set of one or more storage devices. For example, a user may wish to create an archive across a set of hard disk drives, and may store within the archive one or more data sets (e.g., bytes, words, blocks or sequences of data, files, or records). In some scenarios, the storage device(s) may be entirely allocated for the storage of data; e.g., a two-terabyte hard disk drive may be configured to provide a two-terabyte storage set. In other scenarios, the storage set may be redundantly stored on the storage devices in a manner that promotes data accessibility and/or recovery; e.g., a one-terabyte data set may be identically stored on two one-terabyte hard disk drives in order to provide a backup in case either copy becomes corrupt. Multiple storage devices may be configured to interoperate in various ways to store the storage set.

Many such storage schemes and features are included in variations of a Redundant Array of Inexpensive Disks (RAID). As a second example, in a RAID 0 storage scheme, the entire storage space of two or more hard disk drives may be allocated to the storage of data, such that a first hard disk drive may provide access to data stored in one portion of the storage set while a second hard disk drive provides access in parallel to data stored in another portion of the storage set, effectively doubling of the rate of access to the data sets (and possibly comprising a further multiplication for portions of the storage set stored on other hard disk drives). As a second example, in a RAID 1 storage scheme, a first hard disk drive may be entirely allocated to store a storage set, and additional disk drives, operating as mirrors, may store identical copies of the storage set. Performance improvements may be achieved through concurrent access to the storage set provided by different hard disk drives. Additionally, a complete copy of the storage set may be accessed on any hard disk drive, and any hard disk drive that fails (e.g., due to corruption, unresponsiveness, absence, or damage) may be replaced without jeopardizing the availability of the data contained therein. However, RAID 1 schemes significantly reduce the capacity of the storage set (e.g., the addition of hard disk drives does not increase the capacity of the storage set). Additional RAID variations may balance the accessibility, performance, and fault recovery properties of the RAID 0 and RAID 1 arrays while maximizing the capacity of the storage set. For example, in a RAID 4 array comprising a set of hard disk drives of a particular size, the full capacity of all but one of the hard disk drives may provide storage space, while the reserved hard disk drive may store parity information (e.g., an exclusive OR (XOR) calculation for each of the data sets stored on the other hard disk drives). This configuration maximizes storage space (e.g., a RAID 4 array comprising four one-terabyte hard disk drives provides three terabytes of storage space), while also tolerating a one-drive failure; e.g., if any one of the hard disk drives completely fails, it may be replaced with a replacement hard disk drive, and the data on the failed hard disk drives may be reconstructed using the data stored on the remaining hard disk drives. For example, a failed parity hard disk drive may be reconstructed simply by recomputing the XOR values for respective data sets stored on the hard disk drives; and the data stored on a failed one of the other hard disk drives may be reconstructed through the use of the available data sets and the XOR parity value.

Figure 2:
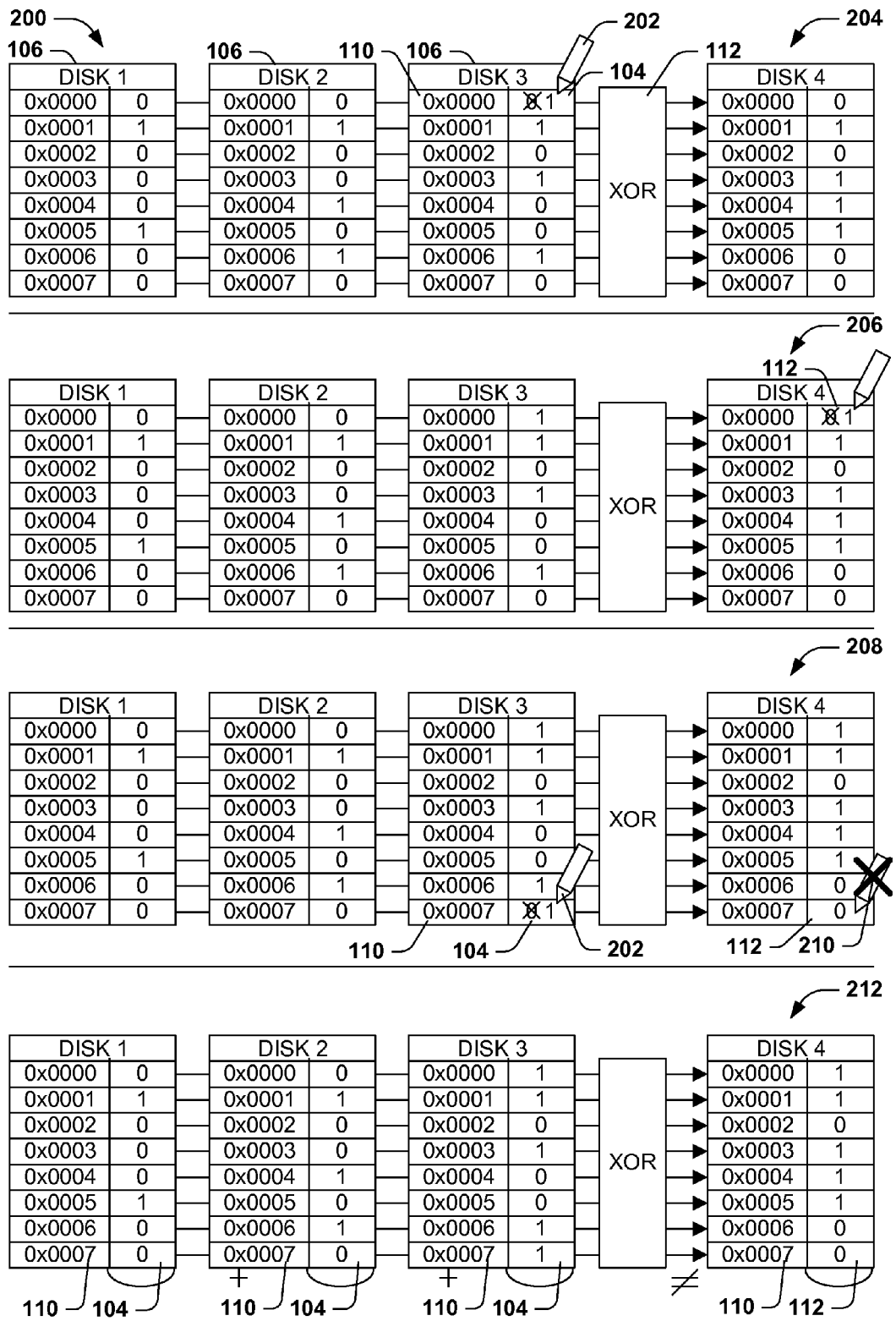
FIG. 2 presents an illustration of an exemplary scenario depicting a consequence of a failure during a write operation within a storage set.

However, within scenarios involving the storage of a storage set comprising various data sets on one or more storage devices, various inefficiencies and problems may arise that affect the performance and/or reliability of the storage set. FIGS. 1 and 2 depict examples of two such problems that may be addressed by the techniques presented herein.

In the exemplary scenario 100 of FIG. 1, a storage set 102, comprising a series of data sets 104 (e.g., various bytes, words, data blocks, files, or records of the storage set 102), may be stored on a storage device 106 (e.g., a hard disk drive). A process generating or accessing the storage set 102 may generate a set of read and/or write requests involving various data sets 104, and may be received and fulfilled by the storage device 106. For example, a hard disk drive may comprise a read/write head 108 that is suspended over a rotating physical medium, and that is capable of reading the data stored under any sector (e.g., radial line of data) of the physical medium that is rotated under the read/write head 108. Thus, when a first data set 104 is received that is to be stored at a first location 110 in the storage set 102, the hard disk drive may rotate the physical medium until the physical location matching the location 110 in the storage set 102 is rotated under the read/wrote head 108, and may then write the data set 104 to the physical medium. However, the performance of such hard disk drives is often limited by the delay while rotating the physical medium to the appropriate position. This delay may be mitigated through sequential accesses; e.g., three data sets 104 comprising a sequence of physical locations on the physical medium may be written in succession, thereby reducing the number of rotational delays in correctly positioning the locations under the read/write head 108 from three to one. Because the rotational delay is often the rate-limiting factor in the throughput of a hard disk drive, sequential accesses may significantly improve the throughput of the storage device 106. Additionally, for each data set 104, a verifier 112 (represented in the exemplary scenario 100 of FIG. 1 as a parity byte computed for each four-byte data set 104) is computed and stored with the data set 104, and may be used to verify the integrity of the data set 104. The exemplary scenario 100 of FIG. 1 presents an efficiency improvement by appending the verifier 112 to the data set 104 in the sector, such that the data set 104 and the verifier 112 may be stored by performing one rotational seek and write request.

FIG. 1 illustrates an exemplary scenario 110 featuring the storage of data sets 104 of a storage set 102 to a storage device 106. In this exemplary scenario 100, a sequence of four data sets 104 is received and processed by the storage device 106. At a first time point 114, a first data set 104 is received for storage at a first location 110 in the storage set 102, and the storage device 106 performs a first rotational seek in order to position the read/write head 108 over the corresponding location on the physical medium and writes the first data set 104 and its verifier 112 to the physical medium. At a second time point 116, a second data set 104 is received for storage at a first location 110 in the storage set 102, and the storage device 106 performs a second rotational seek in order to position the read/write head 108 over the corresponding location on the physical medium and writes the second data set 104 and its verifier 112 to the physical medium. Additional rotational seek operations are performed at a third time point 108 and a fourth time point 110, respectively, to store a third data set 104 and a fourth data set 104.

However, the exemplary scenario 100 of FIG. 1 depicts some sources of inefficiency in the writing of data sets 104 to the storage set 102. As a first example, the first data set 104 and the third data set 104 comprise a sequence (e.g., data sets 102 stored at consecutive locations 110 in the storage set 102), as do the second data set 104 and the fourth data set 104. For example, a first process may request a first sequence of writes to the storage set 102 while a second process concurrently requests a second sequence of writes to a different portion of the storage set 102, and the storage device 106 may receive the requests in an interleaved manner. However, in this exemplary scenario 100, the storage device 106 writes the data sets 104 to the physical medium in sequential order of receipt, and thus performs four rotational seeks in order to write the data sets 104. While this write process may strictly preserve the order in which the write requests are received, an improvement in throughput may have been achieved by performing a first rotational seek to store the first data set 104 and the third data 102, and a second rotational seek to store the second data set 104 and the fourth data set 104.

A second source of inefficiency depicted in FIG. 1 arises from unnecessarily writing data to the storage set 102 that is promptly overwritten by a subsequent write. As a first example, the second data set 104 and the fourth data set 104 are both written to the same location 110 in the storage set 102. A recognition of the overwrite may provide an opportunity to improve the performance of the storage device 106 by only writing the latest write 202 (particularly if the overwrite writes the same data as the earlier write). However, the storage device 106 in this exemplary scenario 100 fails to achieve this recognition, and unnecessarily performs two writes of the same data set 104 to the same location 110 in the storage set 102. As a second example, a first verifier 112 may be computed for a first set of data sets 104 (e.g., locations 0x0044-0047), including the first data set 104 and the third data set 104, and a second verifier 112 may be computed for a second set of data sets 104 (e.g., locations 0xA0F0-A0F3), including the second data set 104 and the fourth data set 104. Because of the sequence in which the write requests are received, the storage device 106 computes and writes each verifier 110 twice (e.g., a first computation of the first verifier 110 is performed for and stored with the first data set 104; a first computation of the second verifier 110 is performed for and stored with the second data set 104; a recomputation of the first verifier 110 is performed for and stored with the third data set 104; and a recomputation of the second verifier 110 is performed for and stored with the fourth data set 104). These recomputations may have been avoided, thereby reducing the number of computations and writes, by computing the first verifier 112 once for the first data set 104 and the third data set 104 and computing the second verifier 112 once for the second data set 104 and the fourth data set 104. These and other inefficiencies may arise from the inability of the storage device 106 to identify opportunities to reduce the computations and/or writes involved for write requests for data sets 104 stored sequentially in the storage set 102.

FIG. 2 presents an illustration of an exemplary scenario 200 depicting a second type of problem that may arise in storage sets 102. In this exemplary scenario 200, a set of storage devices 106 interoperates to store a storage set 102 having a set of verifiers 112. In particular, three of the storage devices 106 store three data sets 104 associated with a particular location 110, and a fourth storage device 106 stores verifiers 112 for the three data sets 104; e.g., each data set 104 may comprise a single bit, and the verifier 112 may be computed by XORing together the three bits. (The exemplary scenario 200 of FIG. 2 depicts each data set 104 as a single bit in order to simplify the following explanation, but it may be appreciated that the data sets 104 may be of any size.) When any data set 104 is written, the verifier 112 stored on the fourth storage device 106 is updated to match the updated data sets 104. However, as illustrated in this exemplary scenario 200, the writes to various storage devices 106 may not occur in an atomic and strictly concurrent manner, but may occur at different times; e.g., a request may be received to update both a data set 104 stored on one storage device 106 and the verifier 112 on the fourth storage device 106, but if storage device 106 may be idle while the other storage device 106 is engaged in a write operation, the first storage device 106 may initiate and/or complete its write operation before the second storage device 106. Variations among storage devices 104 in performance (e.g., rotational speeds) and circumstances (e.g., the distance of the write location from the current rotational position of the physical medium) may also contribute to timing differences among storage devices 106. For example, at a first time point 204, a write 202 may be requested to update a data set 104 stored on the third storage device 106 and the corresponding verifier 112 stored on the fourth storage device 106. However, the third storage device 106 may begin and/or complete the write 202 at a first time point 204, while the fourth storage device 106 may complete the write 202 to the verifier 112 at a second time point 206.

The imperfect synchrony of storage devices 106 depicted in the exemplary scenario 200 of FIG. 2 may create an inconsistency in the event of a failure of the storage service. For example, at a third time point 208, another write 202 may be requested to both a data set 104 stored by the third storage device 106 and the corresponding verifier 112 stored by the fourth storage device 106. However, a failure 210 of the computing environment (e.g., a power failure or a hardware or software crash) may occur during this write process. While storage devices 106 and storage arrays are often designed to withstand many such failures 210, this failure 210 may occur after the third storage device 106 has completed the write of the updated data set 104, but before the fourth storage device 106 has written the updated verifier 112. At a fourth time point 212, when the storage devices 106 are again accessible (e.g., when power is restored), the update of the data set 104 stored by the third storage device 106 and the failure of the fourth storage device 106 to update the verifier 112 present an inconsistency: the verifier 112 no longer matches the corresponding data. A similar scenario may occur with the use of a single storage device 106; e.g., redundant copies of a data set 104 stored on a storage device 106 with a single read/write head 108 may present an inconsistency if a failure 210 arises between updating a first copy and a second copy of the data set 104.

This inconsistency, sometimes identified as the "RAID write hole," may result in several problems. As a first example, it may not be possible to identify which of the one or more data sets 104 and/or the verifier 112 is incorrect (e.g., the failure may have similarly occurred after the fourth storage device 106 updated the verifier 112 but before the third storage device 106 completed updating the data sets 104), thereby jeopardizing the integrity of all of the data sets 104 represented by the verifier 112—even the data sets 104 stored on the first and second storage devices 106 that were not even involved in the write 202. As a second example, this inconsistency may not be promptly discovered, but may linger within the storage set 102. Subsequently, if a storage device 106 becomes unavailable (e.g., if the first storage device 106 completely fails or is removed), an attempt to reconstruct the data on the first storage device 106 may utilize the data on the other storage devices, but the inconsistency may result in an incorrect reconstruction of the data. The array therefore fails to provide the expected capability to recover from the failure of a single storage device 106. These and other problems may arise from the imperfect synchrony in the interoperation of the storage devices 106 while storing related data sets 104 in the storage set 102.

B. Presented Techniques

Presented herein are techniques for addressing some of the problems and/or inefficiencies that may arise in storage scenarios, possibly including those illustrated in the exemplary scenarios of FIG. 1 and FIG. 2. In accordance with these techniques, a journal may be generated on one or more of the storage devices 106 storing the storage set 102. Data sets 104 and verifiers 112 to be written to the storage set 102 may first be written to the journal. Moreover, the journal may be structured as a sequence of data sets 104 structured in the sequence of the write order of the data sets 104, such that a storage device 106 that receives a stream of requests to write data sets 104 in various (non-sequential) locations 110 of the storage set 102 may first store the data sets 104 sequentially in the journal. Additionally, in order to commit data to the requested locations 110 in the storage set 102, a number of data sets may be selected that may be written as a batch. For example, the journal may sequentially enqueue data sets 104 to be written to the storage set 102, and may periodically select, from the front of the queue, a set of data sets 104 that may be written in the same batch.

Figure 3:
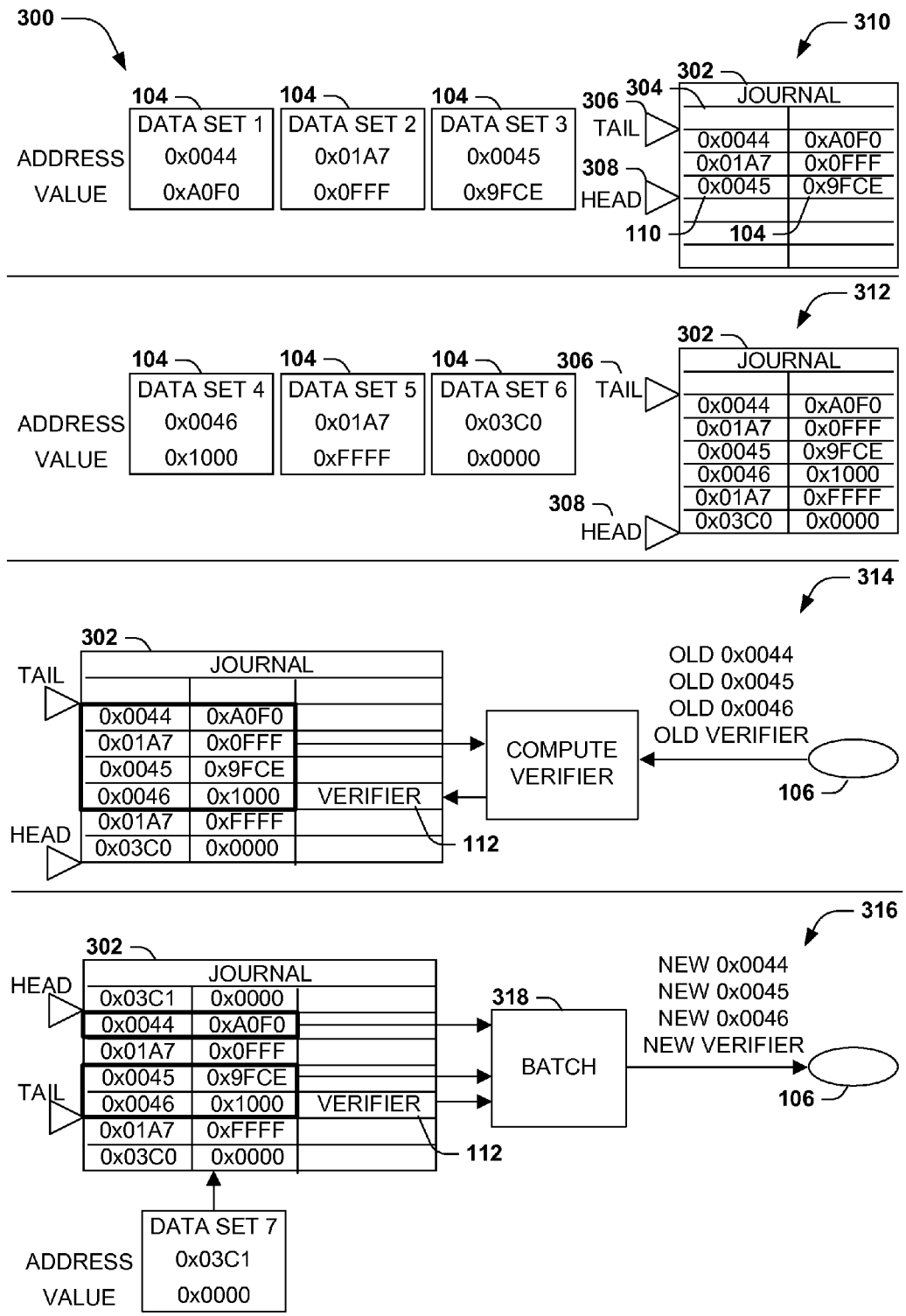
FIG. 3 presents an illustration of an exemplary storage of data sets comprising a storage set on a storage device according to the techniques presented herein.

FIG. 3 presents an illustration of an exemplary scenario 330 depicting the storage of data sets 104 and corresponding verifiers 112 to a storage set 102 through the use of a journal 302 stored on the nonvolatile medium of the storage device 106. In this exemplary scenario 300, on a storage device 106 that is configured to store data sets 104 comprising at least a portion of a storage set 102, a journal 302 is generated that is configured to store the data sets 104 and corresponding verifiers 112 before such data is committed to the storage set 102. In particular, the journal 302 in this exemplary scenario 300 is structured as a sequence of records 304 storing a data set 104, the location 110 of the data set 104 in the storage set 102, and the verifier 112 for the data set 104. The records 304 of the journal 302 are structured as a queue by a tail pointer 306 identifying the beginning of the queue (i.e., the oldest data sets 104 in the journal 304) and a head pointer 308 identifying the end of the queue (i.e., the latest data sets 104 to the written to the journal 304). At a first time point 310, the journal 302 is initially empty (i.e., the head pointer 308 and tail pointer 306 point to the same record 304); and upon receiving a sequence of three data sets 104 to be stored in the storage set 102, the storage device 106 may record the three data sets 104, in sequence, to the journal 302 (e.g., by moving the head pointer 308 to allocate records 304, and then writing the data sets 104 into the records 304). At a second time point 312, a sequence of requests to write three additional data sets 104 may be received, and may be stored in the journal 302 by incrementing the head pointer 308 and writing the data sets 104 to the records 304 of the journal 302. Additionally, at a third time point 314, the storage device 106 may compute a verifier 112 for each data set 104 and write each verifier 112 to the journal 302 (possibly using other data sets 104 stored in the journal 302 and/or the storage set 102. At a fourth time point 316, the storage device 106 may commit a batch 318 of data sets 104 to the storage set 102, e.g., by selecting from the journal 392 a batch 318 of data sets 104 to be committed and writing the data sets 104 and corresponding verifiers 112 to the storage set 102. The records 304 for the data sets 104 that have been committed to the storage set 102 may then be removed from the journal 302 (e.g., by advancing the tail pointer 306 past the records 302). In this manner, the data sets 104 may be committed to the storage set 102 according to the techniques presented herein.

The depiction in FIG. 3 of an exemplary use of some of the techniques presented herein illustrates some potential advantages that may be achievable thereby. As a first example, the batching of data sets may coalesce a sequence two or more data sets 104 that may be written to a continuous sequence of locations 110 in the storage set 102, even if the write requests for the data sets 104 comprising the sequence are interleaved with other data sets 104 to be stored in other locations 110 of the storage set 102; even if such data sets 104 are not received in strict sequential order; and/or even if brief delays occur between the requests to write the data sets 104. As a second example, the batching of data sets 104 may improve the efficiency of the storage device 106 by reducing overwrites of the same data that are received in a short time frame. For example, multiple requests to overwrite a particular data set 104 may be grouped into a batch, and may be fulfilled through a single write of the data set 104 to the location 110 in the storage set 102. For example, the selection of the batch 318 in the exemplary scenario 300 of FIG. 3 omits a data set 104 that is near the tail pointer, but that is overwritten by a subsequent write 202 stored in the journal 302. As a third example, separate requests to write data sets 104 represented by the same verifier 112, if grouped into the same batch, may result in a single computation and write of the verifier 112 instead of several separate updates of the verifier 112. As a fourth example, by selecting the batch 318 conservatively (e.g., not aggressively emptying the journal 302, but leaving some records 304 therein), the techniques may identify and achieve opportunities for future efficiency gains. For example, the data set 104 to be written to location 0x03C0 is not selected for the batch 318, as it has been recently received and may be promptly followed by requests to write additional data sets 104. Thus, when a subsequent request to write a data set 104 to location 0x03C1 is received and stored in the journal 302, both data sets 104 may be selected for a future batch 318, thereby committing both data sets 104 together in sequence rather than issuing two separate writes 202.

A second potential advantage of the presently disclosed techniques illustrated in the exemplary scenario 300 of FIG. 3 is a reduction of the incidence and consequences of the RAID write hole. Committing requests to update a data set 104 first to the journal on the nonvolatile medium of the storage device 106, and then moving the data set 104 and verifier 112 to the storage set 102, may avoid an inconsistent therebetween. For example, if a failure 210 occurs while the data set 104 and/or verifier 112 are being written to the journal, a recovery process may detect that the journal was incompletely written, and may discard the incomplete portion of the journal. While this discarding may result in a loss of writes 202, such writes 202 were not yet committed to the storage set 102 and were not confirmed to the processes requesting such writes 202, and thus may be safely lost. Additionally, the consistency of the storage set 102 is not compromised by the incomplete write involved in the RAID write hole. Further, if a failure 210 occurs while the contents of the journal are being committed to the storage set 102, the storage device 106 may recover from the failure 210 by re-committing the data sets 104 stored in the journal to the storage set 102. In this manner, writes 202 to the storage set 102 may be fulfilled with improved performance and/or with a reduced incidence of inconsistencies caused by problems such as the RAID write hole. These and other advantages may be achievable through the storage of data sets 104 to a storage set 102 according to the techniques presented herein.

C. Exemplary Embodiments

Figure 4:
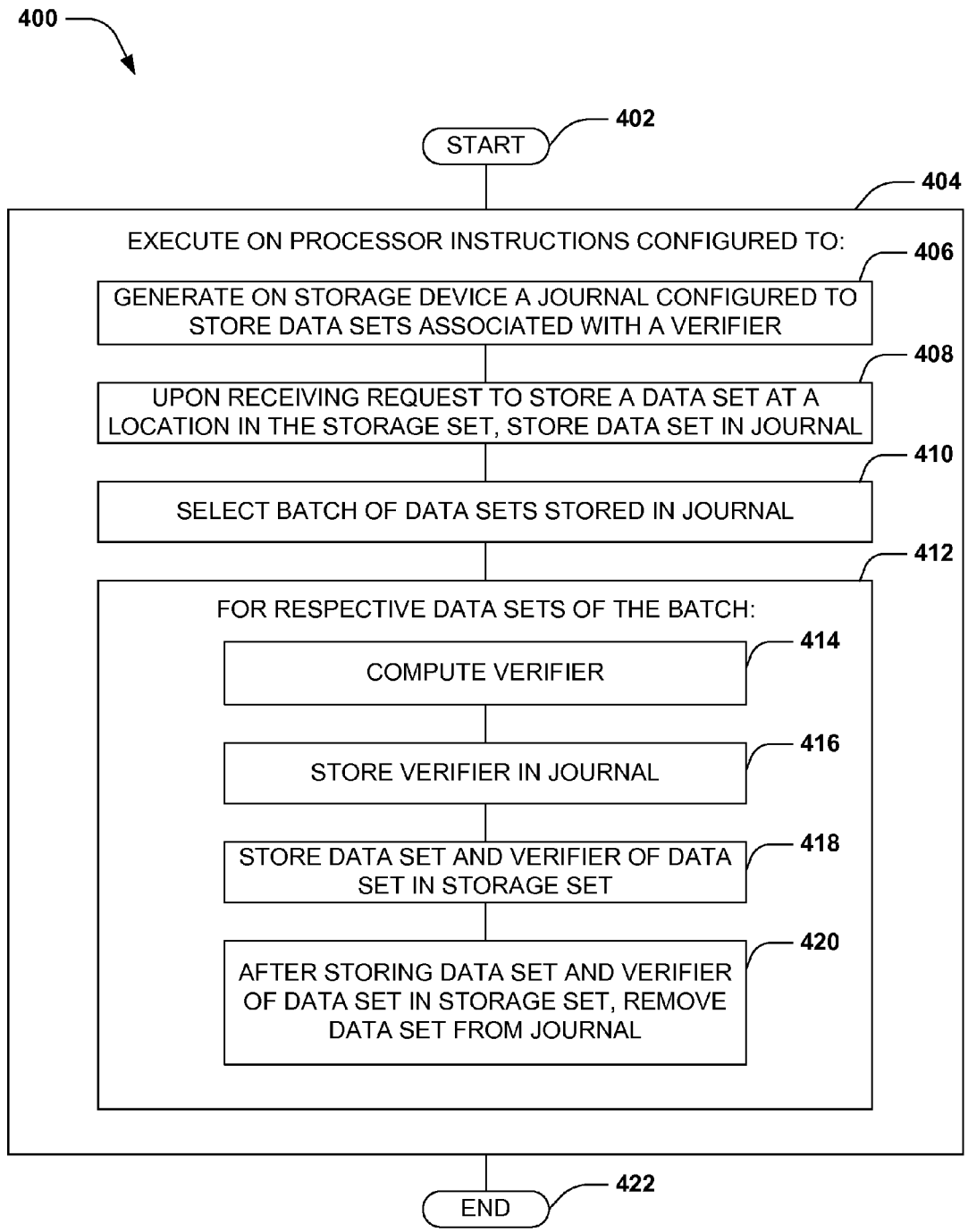
FIG. 4 presents a flowchart illustrating a first exemplary method of storing data sets comprising a storage set on at least one storage device according to the techniques presented herein.

FIG. 4 presents an illustration of a first exemplary embodiment of these techniques, depicted as a first exemplary method 400 of storing data sets 104 in a storage set 102 provided by at least one storage device 106. The exemplary method 400 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 400 begins at 402 and involves executing 404 the instructions on the processor. Specifically, the instructions are configured to generate 406, on at least one storage device 106, a journal 302 configured to store data sets 104 respectively associated with a verifier 112. The instructions are also configured to, upon receiving a request to store a data set 104 at a location 110 in the storage set 102, store 408 the data set 104 in the journal 302. The instructions are also configured to select 410 a batch 318 of data sets 104 stored in the journal 302, which are to be committed to the storage set 102. The instructions may achieve this commitment to the storage set 102 by, for respective 412 data sets 104 of the batch 318, computing 414 a verifier 112; storing 416 the verifier 112 in the journal 302; and storing 418 the data set 104 and the verifier 112 of the data sets 104 in the storage set 102. The instructions are also configured to, after storing 418 the data set 104 and the verifier 112 of the data set 104 in the storage set 102, remove the data set 104 from the journal 302. In this manner, the instructions achieve the storing of data sets 104 in the storage set 102 according to the techniques presented herein, and the exemplary method 400 so ends at 420.

Figure 5:
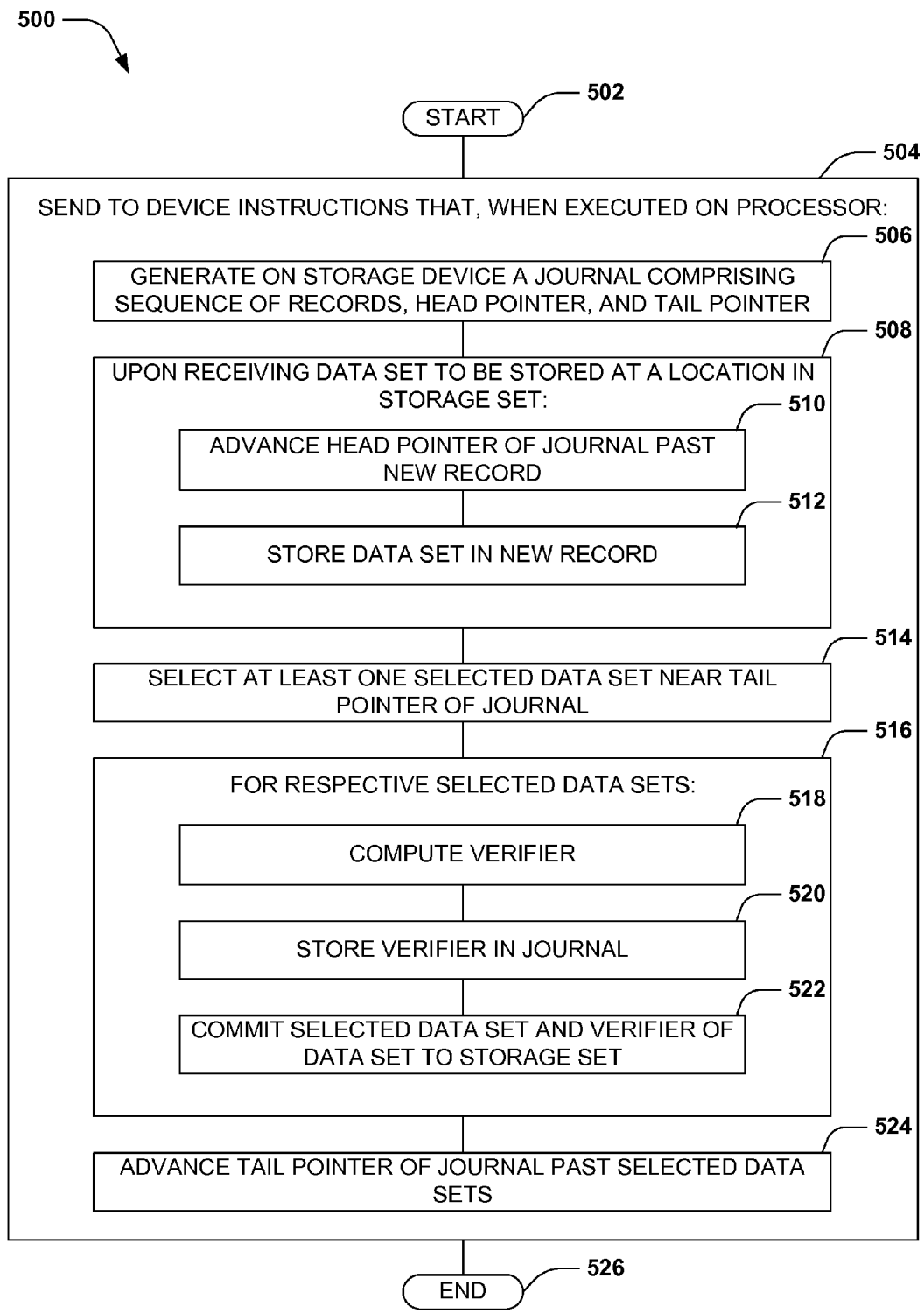
FIG. 5 presents a flowchart illustrating a second exemplary method of storing data sets comprising a storage set on at least one storage device according to the techniques presented herein.

FIG. 5 presents an illustration of a second embodiment of these techniques, illustrated as a second exemplary method 500 of storing data sets 104 in a storage set 102 provided by at least one storage device 106. The exemplary method 500 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 500 begins at 502 and involves sending 504 the instructions to the device. Specifically, the instructions are configured to generate 506 on a storage device 106 a journal 302 comprising a sequence of records 304, a head pointer 308, and a tail pointer 306. The instructions are also configured to, upon receiving 508 a data set 104 to be stored at a location 110 in the storage set 102, advance 510 the head pointer 308 of the journal 302 past a new record 304, and store 512 the data set 104 in the new record 304. The instructions are also configured to select 514 at least one selected data set 104 near the tail pointer 306 of the journal 302 for commitment to the storage set 102. For the respective 516 selected data sets 104, the instructions are configured to compute 518 a verifier 112 for the selected data set 104; store 520 the verifier 112 of the selected data set 104 in the journal 302; and commit 522 the selected data set 104 and the verifier 112 of the data set 104 to the storage set 102. The instructions are also configured to advance 524 the tail pointer 306 of the journal 302 past the records 304 comprising the at least one selected data sets 104. In this manner, the instructions achieve the storing of data sets 104 in the storage set 102 according to the techniques presented herein, and the exemplary method 500 so ends at 526.

Figure 6:
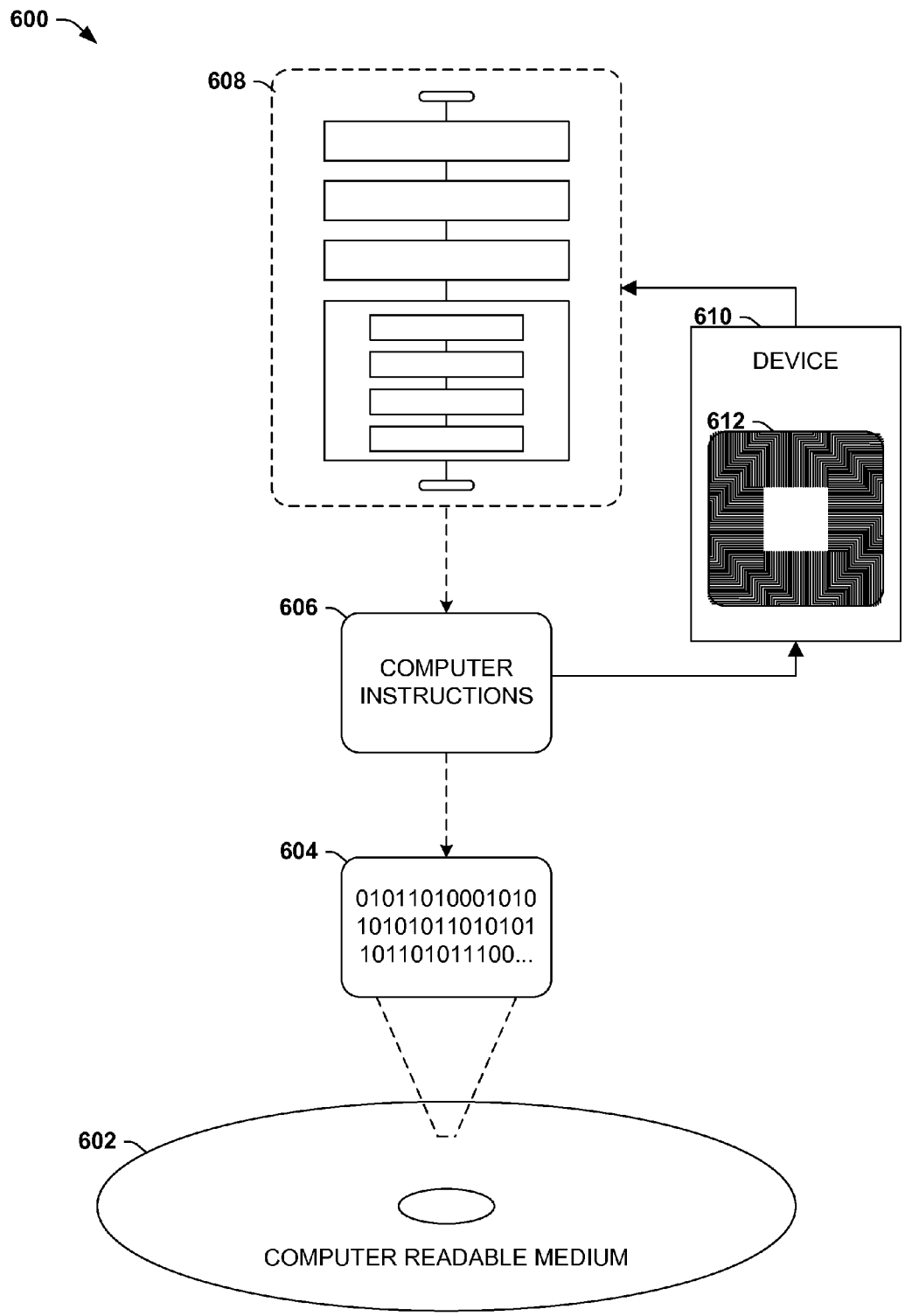
FIG. 6 is an illustration of an exemplary computer-readable storage medium comprising processor-executable instructions configured to store data sets comprising a storage set on at least one storage device according to the techniques presented herein

FIG. 6 presents a third exemplary embodiment of these techniques, illustrated as an exemplary computer-readable medium 600 comprising processor-executable instructions 602 configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor 612 of a device 610 such as a computer, cause the device 610 to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. In one such embodiment, the processor-executable instructions 602 may be configured to perform a method of storing data sets 104 in a storage set 102 provided by at least one storage device 106, such as the first exemplary method 400 of FIG. 4, or the second exemplary method 500 of FIG. 5. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the first exemplary method 400 of FIG. 4 and the second exemplary method 500 of FIG. 5) to confer individual and/or synergistic advantages upon such embodiments.

D1. Scenarios

A first aspect that may vary among embodiments of these techniques relates to the scenarios wherein such techniques may be utilized. As a first variation, these techniques may be used to manage many types of storage sets 102 and data sets 104, including one or more volumes respectively comprising a set of values stored at respective addresses; file systems respectively comprising a set of files; databases respectively comprising a set of records; media libraries respectively comprising a set of media objects; application sets respectively comprising a set of applications; and computing environment servers respectively comprising a set of volumes and/or memories of virtual machines. Additionally, the identification of a data set 104 within a storage set 102 may vary in granularity among different scenarios; e.g., a storage set 102 comprising a volume may utilize these techniques to journal and commit to the storage set 102 data sets 104 comprising bits, bytes, words of various lengths, data blocks of various lengths, or sectors.

As a second variation, these technique may be used to manage the storage of storage sets 102 and data sets 104 on various types of volatile and nonvolatile storage devices 106, including hard disk drives, solid-state storage devices, magnetic or optical tape storage drives, and magnetic or optical discs. The number of storage devices 106 involved in storing the storage set 102 may also vary; e.g., these techniques may be used to manage the storage of a storage set 102 on a single storage device 106, on a small and tightly integrated set of storage devices 106 (e.g., a RAID array), or a loosely integrated set of storage devices 106 that may be potentially large and/or potentially widely distributed (e.g., a set of storage devices 106 deployed in different areas of the world and communicating over the internet). As but one example, these techniques may be adapted for use with different RAID levels implemented in various types of RAID arrays of storage devices 106. Moreover, the storage devices 106 storing the storage set 102 may also be of mixed types, and may be organized according to various hierarchical arrangements (e.g., the storage set 102 may first be stored on a comparatively high-performance primary storage device 106 that is backed up to a comparatively low-performance offsite archive storage device 106). The techniques may be also be implemented in view of and attuned to various properties of the storage set 102 and storage devices 106, including cost, availability, reliability, performance demands, and sensitivity and security measures applied to the storage set 102, and the capabilities of the storage devices 106.

A third variation of this first aspect relates to the relationships of journals 302 with storage devices 106, particularly where the storage set 102 spans multiple storage devices 106. As a first such example, a journal 302 may be stored exclusively on one storage device 106 for a storage set 102 allocated across one or more separate storage devices 106. Alternatively, the journal 302 may be stored on the same storage device 106 as part or all of the storage set 102. As a second such example, multiple journals 302 may be generated among the storage devices 106. For example, for a storage set 102 spanning several storage devices 106, a journal 302 may be generated on each storage device 106 for the data sets 104 store in the portion of the storage set 102 stored on the storage device 106. Alternatively, journals 302 on separate storage devices 106 may not be associated with particular locations in the storage set 102; e.g., a data set 104 to be written to the storage set 102 may be stored in any journal before being committed to the storage set 102. This variation may provide a decentralized journaling process; e.g., a data set 104 may be written to the journal 302 of the storage device 106 having the shortest I/O queue, or, for a storage set 102 shared among a geographically distributed set of storage devices 106, to the storage device 106 presenting the highest accessibility to the writing process (e.g., the storage device 106 that is geographically closest to the process and/or featuring the lowest latency or highest bandwidth while communicating with the writing process). As a third such example, a journal 302 may be redundantly stored as two or more copies on the same storage devices 106, may be stored as mirror copies on two or more storage devices 106, or distributed (e.g., by striping) across two or more storage devices 106, in order to confer upon the journal 302 similar fault-tolerance features as provided by various RAID storage schemes.

A fourth variation of this first aspect relates to the types of verifiers 112 used to verify the integrity of respective data sets 104. In some scenarios, a comparatively simple verifier 112 may be used, such as a parity bit computed as an XOR of the data sets 104, or a sum or hashcode of the data sets 104. A simple verifier 112 may be suitable for comparatively low-value storage sets 102, comparatively low-powered storage devices 106 (e.g., a storage device on a portable device having comparatively slow hardware, limited-capacity memory, and limited battery life), and/or storage sets 102 for which performance is highly significant, such that more rapidly computable verifiers 112 may be advantageous. In other scenarios, a comparatively complex verifier 112 may be used that may provide additional data security features. For example, an error-correcting verifier 112, such as a Hamming code, may be used to determine not only whether the data sets 104 are accurate, but also whether an inconsistency has been caused by a change to one of the data sets 104 and/or the verifier 112. Moreover, different types of verifiers 112 may be utilized for different sets or types of data sets 104 in the storage set 102 (e.g., more complex but durable verifiers 112 may be utilized for more valuable data). Those of ordinary skill in the art may implement the techniques presented herein in many scenarios having these and other types of variations and details.

D2. Elements

A second aspect that may vary among embodiments involves variations of the elements of these techniques. As a first variation, many techniques may be used while generating 406 the journal 302. For example, the journal 302 may comprise many types of data structures, such as an array, a linked list, a table, a database, a stack, a queue, a heap, or a binary tree. Different implementations may present various advantages and disadvantages (e.g., performance, ease of updating, space efficiency, computing economy, and compatibility with the characteristics of the storage device 106 and/or storage set 102). Different types of journals 302 may also be implemented on different storage devices 106 storing the storage set 102 and/or for different types of data sets 104. For example, a journal 302 structured as an array, comprising a head pointer 308 and a tail pointer 306, may provide the advantages of rapid index (e.g., O(1) access time) to any record 304 of the journal 302, efficient allocation and re-use of records 304 through manipulation of the head pointer 308 and the tail pointer 306, and efficient storage of data sets 104 in the journal 302 (e.g., by simply appending the new data set 104 to the sequence of records 304 comprising the journal 302).

As a second variation of this second aspect, the selecting 410 of batches 318 to be committed to the storage set 102 may be performed in many ways. As a first example, the selecting 410 may be initiated by many types of events. For example, a device 610, storage device 106, or other type of device implementing these techniques may initiate the selecting 410 of batches 318 upon detecting many types of commit events. Some examples of such commit events (comprising an exemplary commit event set) include a journal capacity event involving a capacity of the journal 302 (e.g., the journal 302 becoming full); a duration event involving a duration of the data sets 104 stored in the journal 302 (e.g., data sets 104 older than a certain age, such as data sets 104 stored in the journal 302 more than a minute ago); a commit request event involving a request to commit at least one data set 104 in the journal 302 to the storage set 102 (e.g., a process that requested the write 202 of a data set 104 may request a commitment of the data set 104 to the storage set 102); and a storage device workload event involving a workload of at least one storage device 106 of the storage set 102 (e.g., a storage device 106 may detect an idle moment of input/output work and may use the idle moment to flush some data sets 104 from the journal 302). Many other types of events may prompt an initiation of the process of committing data sets 104 to the storage set 102.

As a second example of this second variation of this second aspect, the selection of a batch 318 of data sets 104 to be committed to the storage set 102 may be performed in many ways. For example, it may be advantageous to defer the committing of a first data set 104 to the storage set 102 for a brief duration after receiving the write request, in case subsequent writes 202 specify an overwriting of the first data set 104 and/or provide additional data sets 104 that sequentially follow the first data set 104 and that therefore may be written together to the storage set 102 (e.g., as depicted at the fourth time point 316 in the exemplary scenario 300 of FIG. 3). However, it may be disadvantageous to defer the committing of a data set 104 for an extended period of time, when the value of the reduced probability of imminently receiving a sequentially following second data set 104 is outweighed by the cost and complexity involved in storing the data set 104 as a record 304 of the journal 302. Additionally, it may be advantageous to select the data sets 104 comprising a batch 318 in order to improve the efficiency of the commitments to the storage set 102. As a first such example, when a first data set 104 stored in the journal 302 is selected for inclusion in a batch 318 that is to be stored at a first location 110 in the storage set 102, an embodiment may also select for inclusion in the batch 318 a second data set 104 that is also stored in the journal 302 and that is to be stored at a second location 110 that is near the first location 110 in the storage set 102 (e.g., data sets 104 that are consecutive or at least physically nearby on the physical medium of the storage device 106, and that may efficiently be written together in the same batch 318). As a second such example, an embodiment of these techniques may omit from a batch 318 a first data set 104 that is stored in the journal 302 and that is to be stored at a location 110 in the storage set 102, if the embodiment determines that the journal 302 also includes a second data set 104 that is newer than the first data set 104, and that is to be stored at the same location 110 in the storage set 102 (i.e., a subsequent overwrite). Rather than including the data set 104 in the batch 318, the embodiment may simply remove the older data set 104 from the journal 302.

As a third variation of this second aspect, the computing 414 of verifiers 112 may occur in many ways. As a noted variation of the first aspect, many types of verifiers 112 may be utilized in such scenarios, but additionally, the verifier 112 may be computed from the available data in various ways. As a first example, the verifier 112 may be entirely recalculated based on the current data sets 104 represented thereby. However, as a second example, when a verifier 112 represents several data sets 104 of which a subset of data sets 104 changes, it may be possible, and occasionally more efficient, to remove the stale data sets 104 from the verifier 112 and include the updated data sets 104 in the verifier 112 than to recompute the verifier 112 from the current data sets 104, which may involve retrieving the remainder of the data set 104 from the storage set 102.

Figure 7:
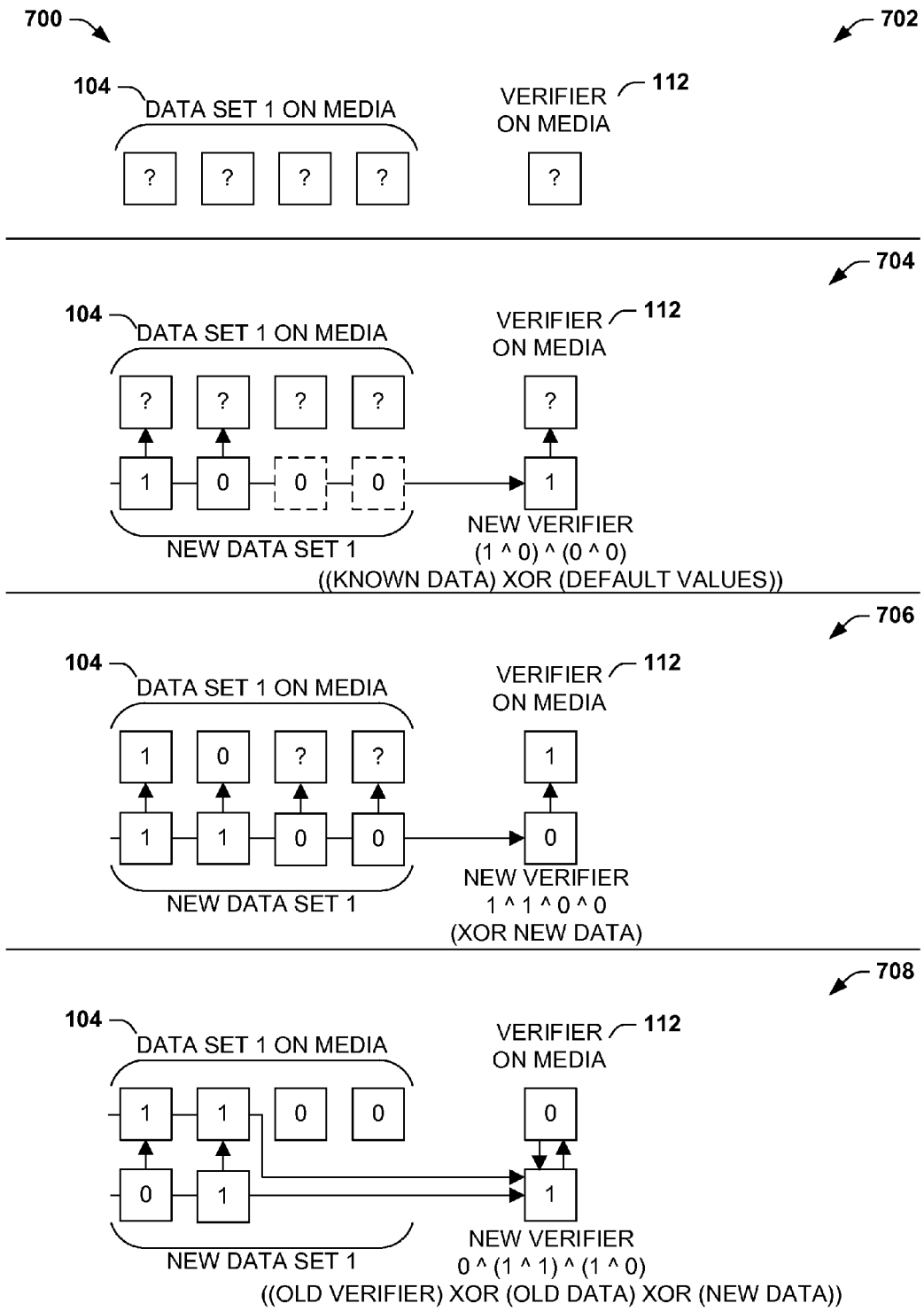
FIG. 7 is an illustration of an exemplary scenario featuring various techniques for computing the verifier of a data set.

FIG. 7 presents an illustration of an exemplary scenario 700 featuring different ways of computing the verifier 112. At a first time point 702, space has been allocated for a data set 104 and corresponding verifier 112 in the storage set 102. However, neither any portion of the data set 104 nor the verifier 112 has yet been written to the storage set 102. At a second time point 704, a portion of the data set 104 has been received, and a request to commit the data set 104 to the storage set 102 has been initiated. In order to compute the verifier 112, an embodiment of these techniques may identify that the remaining data comprising the data set 104 exists in neither the journal 302 nor the storage set 102. Accordingly, the embodiment may compute the verifier 112 using the provided portion of the data set 104, and may infer and use default values (e.g., zero) for the remainder of the data set 104. Thus, at the second time point 704, the verifier 112 is computed using only the existing portion of the data set 104. At a third time point 706, the verifier 112 is computed using the current data for the data set 104. For example, new and updated data that fully specifies the data set 104 may have been provided (e.g., a series of writes 202 that comprise the full data set 104 may exist in the journal 302, or the portions of the data set 104 that do not exist in the journal 302 may be retrieved from the storage set 102), and the verifier 112 may be entirely recomputed using the current data comprising the data set 104 (e.g., as an XOR of all of the current data). However, at a fourth time point 708, the verifier 112 is recomputed in view of a change to the data set 104 using only the original verifier 112 and the original and new versions of the data set 104. For example, the new verifier 112 may be computed by XORing the original verifier 112 with the original version of the data set 104, thereby reversing the addition of that portion of the data set 104 from the original verifier 112, and then XORing this value with the new version of the data set 104. This recalculation may be more efficient for a data set 104 that is not completely stored in the journal 302; e.g., this recalculation may avoid reading the portion of the data set 104 that is not stored in the journal 302 from the storage set 102. Moreover, a selection between these recalculation techniques may be made based on the comparative cost of retrieving this portion of the data set 104 from the storage set 102 (e.g., for a verifier 112 representing a large data set 104, it may be more efficient to remove and include an update of a small portion of the data set 104, and to recalculate the verifier 112 from the current data for an update of a large portion of the data set 104).

As a fourth variation of this second aspect, in the event of a failure 210 of the storage set 102 (e.g., a power failure or a software crash) and/or one or more storage devices 106 (e.g., an interruption of communication with the storage device 106, a hardware, firmware, or driver failure of the storage device 106, or a removal of or damage to the storage device 106, followed by a reestablishment of communication or a replacement of the storage device 107), an embodiment of these techniques may utilize the journal 302 in many ways to recover from the failure 210. As a first example of this fourth variation of this second aspect, an embodiment of these techniques may simply review the journal 302, discard any incomplete or inconsistent records 304 in the journal 302 (e.g., records that were incompletely written at the moment of the failure 210), and then recommence committing data sets 104 from the journal 302 to the storage set 102. In the process, any data sets 104 that may have been incompletely written to the storage set 102 may be correctly rewritten during the recovery process, even without detecting the incomplete writing of the data set 104 to the storage set 102.

As a second example of this fourth variation of this second aspect, the recovery from a failure 210 may be performed in a phased manner. For example, it may be advantageous to recover from a failure 210 as rapidly as possible (e.g., in order to reduce the downtime of a service utilizing the storage set 102), while also ensuring that accesses to the storage set 102 provide valid and consistent data. Accordingly, during a first phase of the recovery, an embodiment of these techniques may first read the contents of a journal 302 (e.g., the locations 110 within the storage set 102 where a data set 104 is stored in the journal 302), in order to determine whether accesses to the storage set 102 are to be fulfilled from the journal 302 or from the storage set 102. The recovery may then proceed to a second phase involving recommencing the commitment of data sets 104 from the journal 302 to the storage set 102 in order to correct incompletely and/or inconsistently written data sets 104 caused by the failure 210. Thus, the embodiment may block Additional exemplary variations of the recovery process may involve, e.g., scanning part or all of the storage set 102 to verify the integrity thereof; applying the recovery process only to the storage devices 106 involved in the failure (e.g., only rewriting data sets 104 from the journal 302 to the storage device 106 that was temporarily removed); and applying different recovery processes for different storage devices 106 and/or different data sets 104 (e.g., applying the recovery process to a first journal 302 stored on a first storage device 106, and completing the recovery thereof, before applying the recovery process to a second journal 302 stored on a second storage device 106). Those of ordinary skill in the art may devise many such ways of varying the elements of the techniques presented herein for application in different scenarios.

D3. Volatile Memory Representation of the Journal

A third aspect that may vary among embodiments of these techniques involves the generation, in a volatile memory of a device 610 implementing such techniques, of a volatile memory representation of the journal 302. For example, in addition to the journal 302 generated on the nonvolatile medium of a storage device 106, an embodiment of these techniques may generate a volatile memory representation that also stores the data sets 104 stored in the journal 302, and that is kept in sync with the journal 302. While the generation and maintenance of a volatile memory representation to the journal 302 may add complexity and consume additional computing resources, the volatile memory representation may provide many potential uses and advantages in embodiments of these techniques. As a first exemplary advantage, the volatile memory representation may serve as a write buffer to the journal 302; e.g., instead of writing individual data sets 104 to the journal 302, an embodiment may initially store the data sets 104 in the volatile memory representation, and may commit a block of data sets 104 to the journal 302, thereby extending the efficiency gain of sequential writes 202 of the data sets 104 to the journal 302 with the batching of writes 202 to the journal 302. As a second exemplary advantage, the volatile memory representation may serve as a read cache of recently written data sets 104; e.g., instead of reading a recently written data set 104 from the journal 302 stored on the comparatively slow storage device 106, an embodiment may provide the data set 104 from the volatile memory representation. An embodiment of these techniques may therefore endeavor to retrieve a requested data set 104 according to its availability in the journal 302 and the volatile memory representation. For example, the embodiment may, upon determining that the data set 104 is stored in the volatile memory representation of the journal 302 in the volatile memory, retrieve and present the data set 104 stored in the volatile memory representation; upon determining that the data set 104 is stored in the journal 302 on a storage device 106, retrieve and present the data set 104 stored in the journal 302; and may otherwise retrieve and present the data set 104 stored in the storage set 102 on the storage device 106. A data set 104 may also span two or more of these sources; e.g., a first portion of a requested data set 104 may exist in and be retrieved from the journal 302, while a second portion of the requested data set 104 may exist in and be retrieved from the volatile memory representation (irrespective of whether this second portion is present in the less accessible journal 302 and/or storage set 104). As a third exemplary advantage, decisions pertaining to the data sets 104 stored in the journal 302, such as the selecting 410 of batches 318, may be more efficiently performed by evaluating the contents of the volatile memory representation, which often provides more rapid access, than evaluating the contents of the journal 302. These advantages of accessibility of the data sets 104 in the rapid but volatile memory of the device 610 may be achieved in parallel with the durability of the data sets 104 through the storage thereof in the journal 302 on the nonvolatile storage device 106.

As a first variation of this third aspect, the volatile memory representation may be structured similarly to the journal 302, or may be generated in a different manner. For example, while it may be advantageous to structure the journal 302 to promote sequential writes on a storage device 106 such as a hard disk drive, this advantage may be diminished in a memory circuit that provides comparatively equivalent sequential and random access; thus, the volatile memory representation may be generated in another manner, such as indexed according to the locations 110 in the storage set 102 where the data sets 104 are to be stored, such as a hashtable or a B-tree such as an Adelson-Velskii-Landis tree.

As a second variation of this third aspect, the volatile memory representation may store the same data sets 104 stored in the journal 302, or may store different storage sets 104. As a first such example, the volatile memory representation may temporarily accumulate new data sets 104 to be written together to the journal 302 in the manner of a write buffer. As a second such example, the volatile memory representation may retain data sets 104 that are removed from the journal 302, in furtherance of the use of excess capacity of the volatile memory representation as a volatile memory read cache. For example, after a data set 104 is committed to the storage set 102 and removed from the journal 302 (and perhaps even overwritten), the volatile memory representation may retain the data set 104 in memory, due to the comparatively high probability that a process may request the recently written data set 104. This retention of data sets 104 in the volatile memory representation (following the committing of the data set 104 to the journal 302 and/or the storage set 102) may continue as long as capacity remains in the volatile memory representation, and the volatile memory representation may evict previously committed data sets 104 in order to provide capacity for newly received and as-yet uncommitted data sets 104. In this scenario, it may be advantageous for the volatile memory representation to differentiate data sets 104 that have been committed to the journal 302 and/or the storage set 102 from uncommitted data sets 104. For example, upon storing a data set 104 in the journal 302, an embodiment may store the data set 104 in the volatile memory representation of the journal 302 and mark the data set 104 as unremovable; and upon committing a data set 104 stored in the journal 302 to the storage set 102, the embodiment may mark the data set 104 stored in the volatile memory representation as removable. Subsequently, in order to free capacity in the volatile memory representation, the embodiment may safely remove from the volatile memory representation of the journal 302 only the data sets 104 that are marked as removable. This variation maintains the synchrony of the journal 302 and the volatile memory representation while advantageously utilizing the spare capacity of the volatile memory representation as a read cache.

Conversely, and as a third variation of this third aspect, it may be advantageous not to exhaust the capacity of the volatile memory representation in storing committed or uncommitted data sets 104, but to reserve sufficient capacity in the volatile memory representation in the volatile memory to store incoming data sets 104. In particular, sufficient capacity may be reserved for a buffer configured to store data sets 104 to be stored in the storage set 102 while the journal 302 is occupied with committing other data sets 104 to the journal 302. This variation further utilizes the volatile memory representation as a write buffer in order to accept incoming data sets 104 without interrupting the storage device 106 from the task of committing data sets 104 from the journal 302 to the storage set 102.

As a fourth variation of this third aspect, a recovery of a failure 210 may also involve the rebuilding of the volatile memory representation 802 of the journal 302. For example, the recovery process may begin by reading the journal 302 to regenerate the volatile memory representation 302. Beginning the rebuilding in this manner may be advantageous, e.g., by reestablishing the read cache and/or write buffer features of the volatile memory representation 802, and thereby reducing the read/write workload of the storage device 106 storing the journal 302 and facilitating the task of committing data sets 104 in the journal 302 to the storage set 102 in order to overwrite incomplete or inconsistent writes 202 caused by the failure 210.

Figure 8:
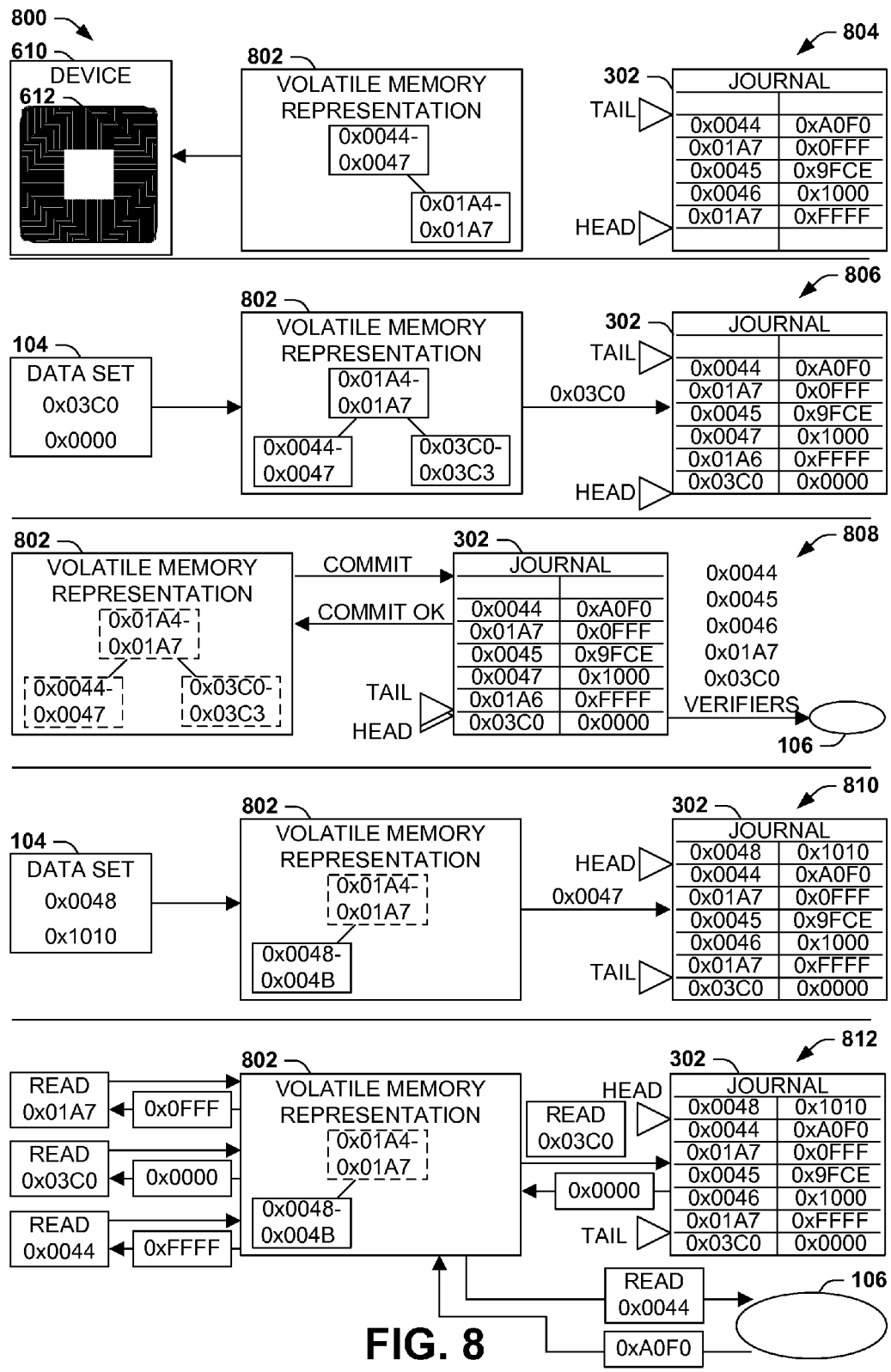
FIG. 8 is an illustration of an exemplary scenario featuring the use of a volatile memory representation of a journal stored on non-volatile media of a storage device.

FIG. 8 presents an illustration of an exemplary scenario 800 wherein a journal 302 generated on a nonvolatile storage device 106 is paired with a volatile memory representation 802 of the journal 302 in the volatile memory of the device 610. In this exemplary scenario 800, the volatile memory representation 802 is stored as a B-tree organized according to the hexadecimal addresses of the locations 110 of the data sets 104 stored in the journal 302. At a first time point 804, the journal 302 and the volatile memory representation 802 may store a particular set of data sets 104; and when, at a second time point 806, a second data set 104 is received to be written to the journal 302, the second data set 104 may be stored in the volatile memory representation 802 and then (directly or through a write buffer) written to the journal 302. Additionally, at a third time point 806, when one or more data sets 104 stored in the journal 302 are committed to the storage set 102 stored on a storage device 106, the data sets 104 may be removed from the journal 302 (e.g., by advancing a tail pointer 306 past the records 302 containing the committed data sets 104), but if spare capacity of the volatile memory representation 802 is available, these data sets 104 may be retained in the volatile memory representation 802, but marked as removable (as indicated in the exemplary scenario 800 of FIG. 8 by a dashed border). The volatile memory representation 802 may thus provide capacity for newly received data sets 104 (e.g., the receipt of a fourth data set 104 at a fourth time point 810). Read requests may therefore be fulfilled according to the availability of the data sets 104 in the volatile memory representation 802, the journal 302, and the storage set 102. For example, at a fifth time point 812, three read requests may be received for three data sets 104, the first of which may be provided from the volatile memory representation 802 (existing therein despite eviction from the journal 302); the second of which may be provided from the journal 302 (having been removed from the volatile memory representation 802 after being committed to the journal 302); and the third of which (having been evicted from the volatile memory representation 802 and the journal 302) may be retrieved and provided from the storage set 102. In this manner, the embodiment of these techniques illustrated in the exemplary scenario 800 of FIG. 8 achieves several advantages through the implementation of a volatile memory representation 802 of the journal 302. Those of ordinary skill in the art may devise such uses of such a volatile memory representation 802 of the journal 302 in accordance with the techniques presented herein.

D4. Interoperation with Write Buffer

A fourth aspect that may vary among embodiments of these techniques relates to the inclusion and utilization of a write buffer in a storage device 106 storing the storage set 102. In many cases, a storage device 106 may advantageously utilize a write buffer to improve performance, e.g., by batching writes 202 of data sets 104 in a volatile memory until a flush request is initiated, and then committing all of the data sets 104 to the storage set 102 stored on the storage device 106. However, the operation of a write buffer on a storage device 106 may diminish the performance of the techniques presented herein, and in fact may cause some problems. For example, if a request to store a data set 104 in the journal 302 results is delayed in the volatile write buffer, then the data sets 104 may be lost if a failure 210 occurs. In particular, the write buffer is often implemented in a transparent manner, such that the operating system or processes may have difficulty determining whether data sets 104 have actually been committed to the 302 journal (unless a flush operation is affirmatively requested and verified as complete), or even whether or not a write buffer exists for the storage device 104. Thus, when a process requests to write a data set 104 to the journal 302, the storage device 106 may promptly indicate to the process that the request has been fulfilled, even if the write is stored in the volatile write buffer instead of in the nonvolatile storage of the journal 302. The application may therefore incorrectly operate as if the data set 104 had been committed, and inconsistencies and unexpected data loss may arise if a failure 210 occurs before the storage device 106 flushes the data set 104 from the write buffer. Similarly, the operation of the write buffer between the journal 302 and the storage set 102 may cause the journal 302 to operate incorrectly as if the data sets 104 had been persistently stored; e.g., the journal may remove data sets 104 that have not yet been committed to the storage set 102, thereby resulting in incomplete and inconsistent data sets 104 in the event of a failure 210 before the write buffer is flushed. Moreover, the advantages that the write buffer may propose (e.g., batched writes 202, coalescence of sequential writes 202, and reduction of overwrites) are already provided by other components of the techniques presented herein. Thus, it may be appreciated that the presence and operation of the write buffer causes added complexity, increased expense, potential performance degradation, and unexpected results, and yet provides few or no advantages that are not already achieved by the techniques presented herein.

In view of these potential disadvantages, an embodiment of these techniques may be adjusted in view of the presence of the write buffer. As a first variation of this fourth aspect, an embodiment of these techniques may avoid the use and effects of the write buffer in various ways. As a first example of this first variation, when writing data sets 104 and verifiers 112 to the journal 302, bypass the write filter, e.g., by issuing the write to the journal 302 as a write-through request, or by simply disabling the write buffer on the storage device 106. As a second example of this first variation, the embodiment may negate the effects of the write buffer by issuing a flush request after each write 202 to the journal 302 and/or the storage set 102 stored on the storage device 106. Although a frequent issuing of flush requests may diminish the performance of the storage device 106, the loss of performance may be reduced in various ways; e.g., if the storage set 102 and/or journal 302 are distributed over a set of storage devices 106 that respectively may or may not comprise a write buffer, an embodiment of these techniques may be configured to issue flush requests only to the storage devices 106 storing the recently written data sets 104.

As a second variation of this fourth aspect, an embodiment of these techniques may interoperate with the write buffer, and may coordinate the operation of the write buffer with the operation of the journal 302 and/or the in-memory representation 802 of the journal 302. As a first example of this second variation, when a storage device 106 storing a journal 302 is flushed, a flush point of the journal 302 may be identified that represents the data sets 104 that have been flushed to the journal 302 (as contrasted with the data sets 104 for which a write request has been issued to the journal 302, but that may remain in the write buffer). For example, in an embodiment featuring a volatile memory representation 802 of the journal 302, the data sets 104 stored in the volatile memory representation 802 may initially be marked as unremovable, and may remain so marked until the flush point of the journal 302 is moved past the data set 104, at which point the volatile memory representation 802 may mark the data set 104 as removable.

Figure 9:
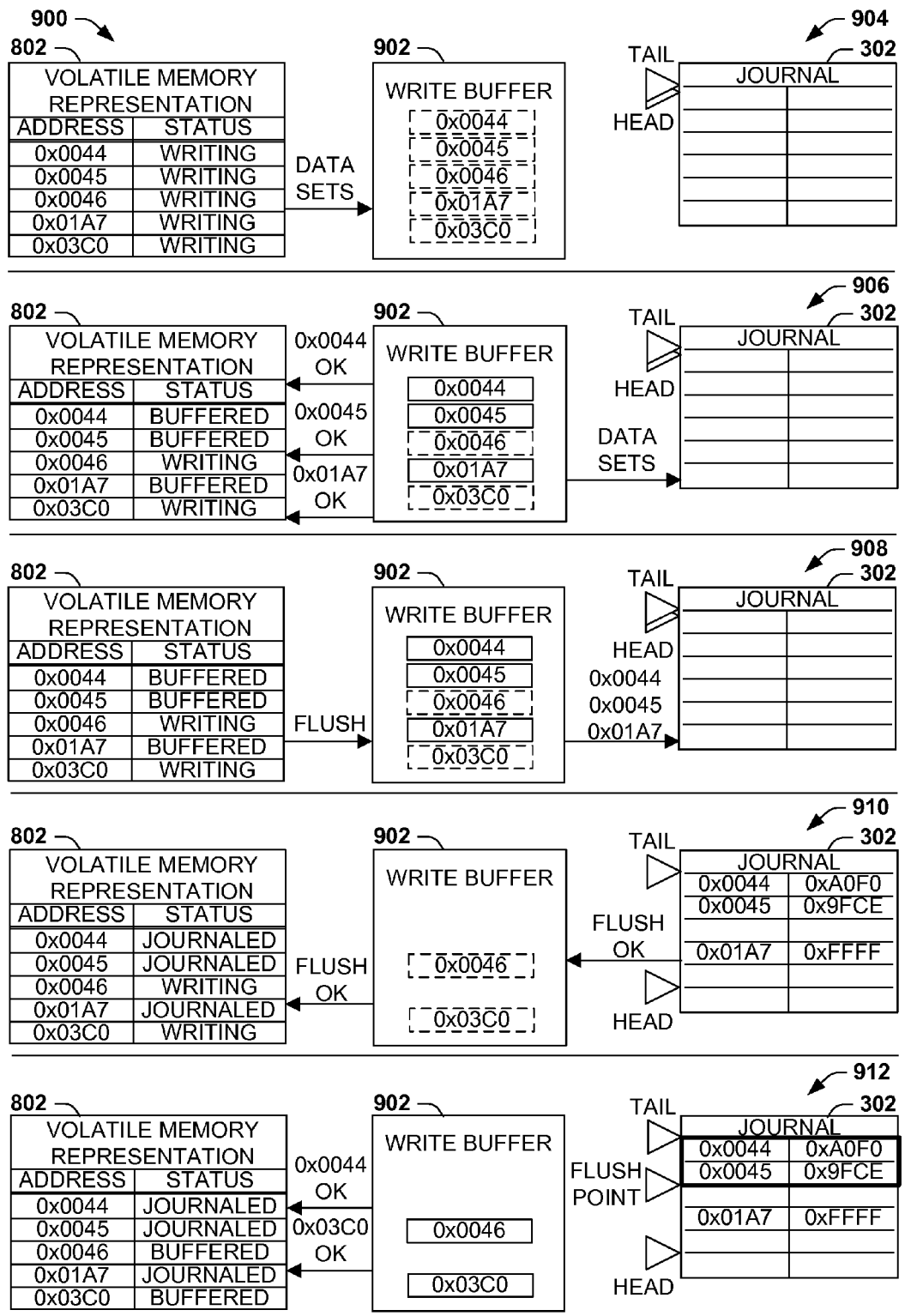
FIG. 9 is an illustration of a first exemplary scenario featuring interactions with a write buffer of a storage device between a journal stored on a storage device and a volatile memory representation of the journal.

FIG. 9 presents an illustration of an exemplary scenario 900 featuring an adaptation of a volatile memory representation 802 to interoperate with a write buffer 902 of a storage device 106 storing the journal 302. In this exemplary scenario 900, data sets 104 that are to be written to the storage set 102 are first stored in the volatile memory representation 802, and are then written to the journal 302 before being committed to the storage set 102. However, a write buffer 902 may exist on the storage device 106 storing the journal 302, and may cause inconsistencies and problems, e.g., if a data set 104 is presumed to have been written to the journal 302 is instead stored in the volatile memory of the write buffer 902, and a failure 210 causes the data set 104 to be lost without being written to the journal 302. Accordingly, the volatile memory representation 902 may record the status of respective data sets 104. For example, at a first time point 904, upon initiating a request to move a set of data sets 104 to the journal 302, the volatile memory representation 802 may record the status of the data sets 104 as in the process of being written to the storage device 106 (i.e., to indicate that a request to write the data sets 104 to the storage device 106 has been initiated, but the storage device 106 has not yet indicated that the write request has been received). At a second time point 906, the storage device 106 responds that the data sets 104 have been received. However, the volatile memory representation may not be able to determine whether the data sets 104 have been committed to the journal 302, or whether the data sets 104 reside in a write buffer 902. Accordingly, at the second time point 906, the volatile memory representation 902 marks the data sets 104 as having been buffered by the storage device 106. Meanwhile, other data sets 104, which the storage device 104 has not yet acknowledged as having fully received, may continue to be marked as in the process of being written to the storage device 106. As a third time point 908, the volatile memory representation 802 may issue a request to flush the write buffer 902, and the write buffer 902 may commence committing the data sets 104 that have been fully received to the nonvolatile storage medium comprising the journal 302. At a fourth time point 910, when the storage device 106 indicates that the flush request has been fulfilled, the volatile memory representation may mark all of the data sets 104 that had previously been marked as buffered (i.e., all of the data sets 104 that the storage device 106 had acknowledged as fully received prior to the flush request) as having been fully journaled, and optionally removable. At a fifth time point 912, the storage device 106 may subsequently indicate that additional data sets 104 have been fully received, and the volatile memory representation 802 may mark these data sets 104 as buffered and ready for commitment to the journal 302 through a second flush request. In this manner, the volatile memory representation 802 tracks the status of the data sets 104 with respect to the write buffer 902 of the storage device 106.

As a third variation of this fourth aspect, a write buffer 902 may also intermediate, and may interfere with, the commitment of data sets 104 from the journal 302 to the storage set 106. In similar manner, the status of the data sets 104 stored in the volatile memory representation 802 and/or the journal 302 may indicate whether the data sets 104 have been flushed from the journal 302 to the storage set 102. For example, an embodiment of these techniques may, upon detecting a commitment of a data set 104 from the write buffer 902 to the storage set 12 (e.g., an acknowledgment of a flush request), mark the data set 104 in the journal 302 and/or the volatile memory representation 902 as committed, and may remove from the journal 302 and/or the volatile memory representation 902 only the data sets 104 that are marked as having been committed to the storage set 104.

Figure 10:
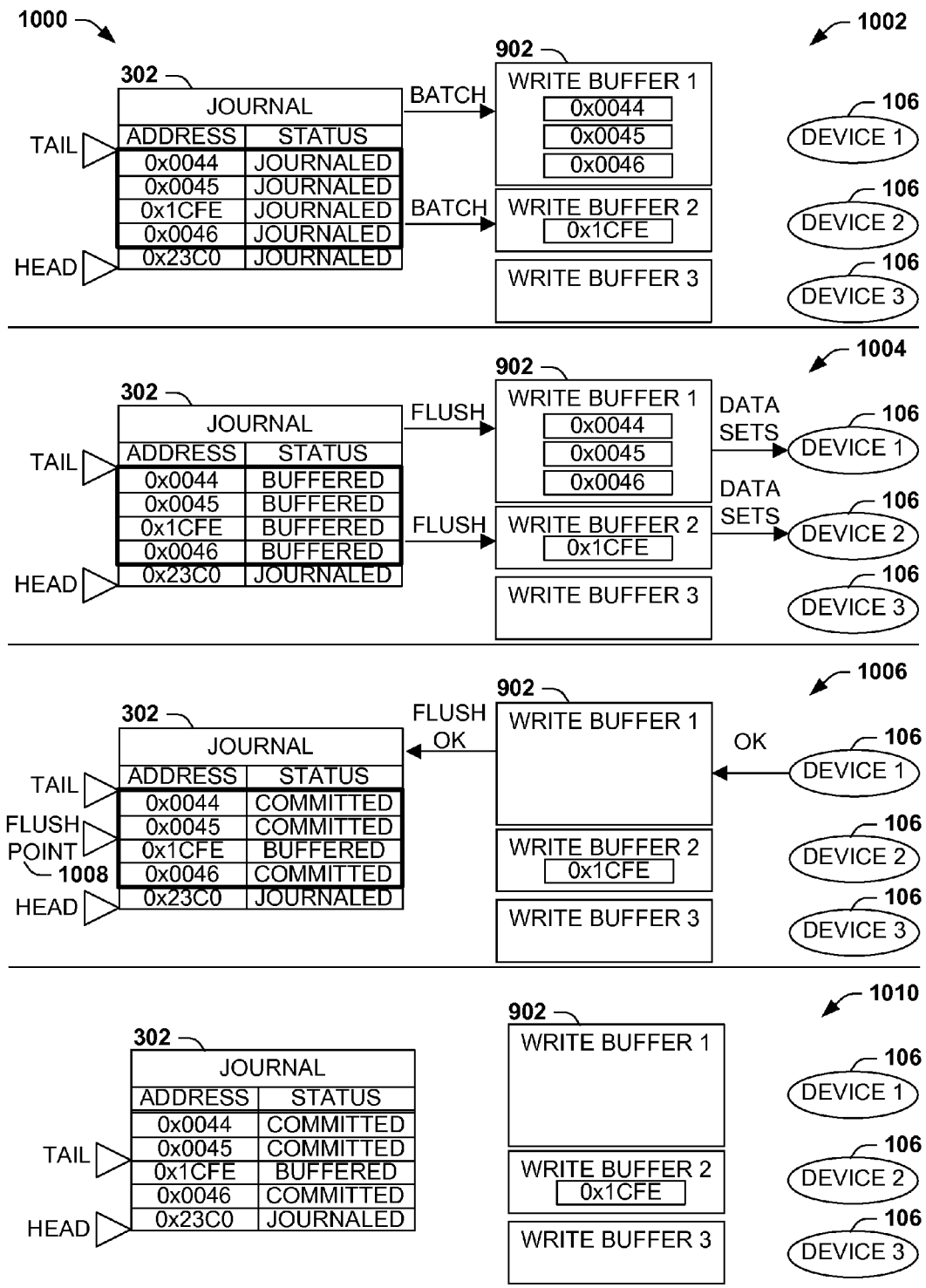
FIG. 10 is an illustration of a second exemplary scenario featuring interactions with a write buffer of a storage device between a journal stored on a storage device and a volatile memory representation of the journal.

FIG. 10 presents an illustration of an exemplary scenario 1000 featuring an adjustment of a journal 302 to interoperate with write buffers 902 of storage devices 106 storing the storage set 102. In this exemplary scenario 1000, the journal 302 stores data sets 104 that are to be committed to a storage set 102 distributed across three storage devices 106, each comprising a write buffer 902. In order to ensure that data sets 104 are fully committed to the physical medium of the storage devices 106 storing the storage set 102, the journal 302 may record the status of the data sets 104 that the journal 302 has requested to be written to the storage set 102. For example, at a first time point 1002, upon identifying a batch 318 of data sets 104 to be committed, the journal 302 may send a write request for each data set 104 to the storage device 106 storing the data set 104. However, when the storage devices 106 acknowledge receipt of the data sets 104, the journal 302 may not presume that the data sets 104 have been committed to the storage set 102, but may be stored in a volatile write buffer 902 on each device 106, and may therefore mark each data set 104 in the journal 302 as having been buffered. At a second time point 1004, the journal 302 may issue flush requests to the storage devices 106 (and, specifically, only to the storage devices 106 storing the buffered data sets 106; e.g., the third storage device 106 does not store any recently committed data sets 104, and is not issued a flush request). At a third time point 1004, when a storage device 106 indicates that a flush request has been fulfilled, the journal 302 may mark the data sets 104 as having been committed. The journal 302 may also identify a flush point 1008 between the head pointer 308 and the tail pointer 306, such that all data sets 104 between the flush point and the tail pointer 306 have been committed to the storage set 102. At a fourth time point 1010, the journal 302 may then evict data sets 104 by moving the tail pointer 308 to the flush point 1008, since any intervening data sets 104 have been fully committed to the storage set 102. In this manner, the journal 302 may be adapted to account for the operation of the write buffers 902 of the storage devices 106 storing the storage set 102. Those of ordinary skill in the art may devise many ways of accounting for the presence and operation of write buffers 902 while implementing the techniques presented herein.

E. Computing Environment

Figure 11:
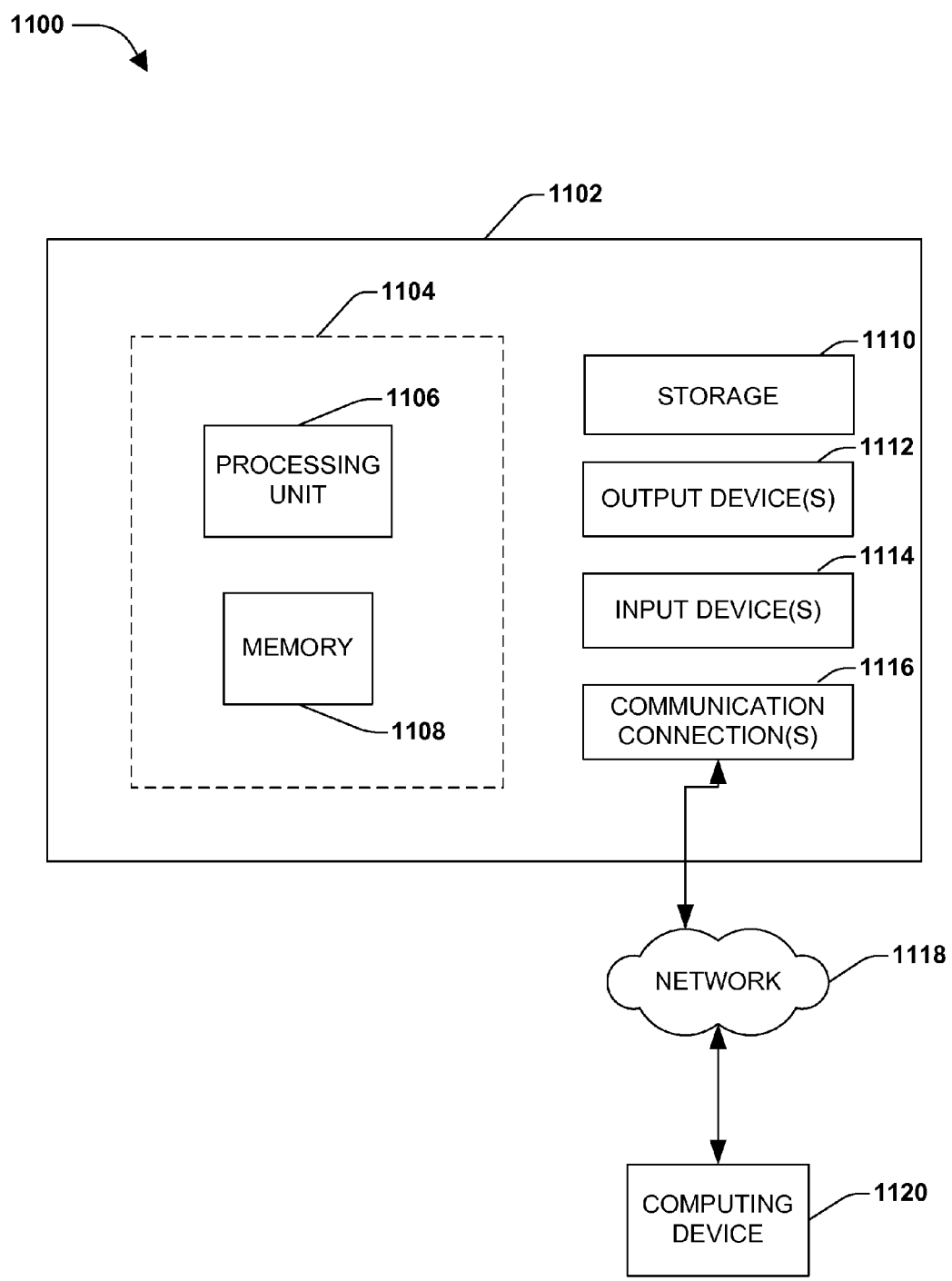
FIG. 11 illustrates an exemplary computing environment wherein one or more of the provisions set forth herein may be implemented.

FIG. 11 presents an illustration of an exemplary computing environment within a computing device 1102 wherein the techniques presented herein may be implemented. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, and distributed computing environments that include any of the above systems or devices.

FIG. 11 illustrates an example of a system 1100 comprising a computing device 1102 configured to implement one or more embodiments provided herein. In one configuration, the computing device 1102 includes at least one processor 1106 and at least one memory component 1108. Depending on the exact configuration and type of computing device, the memory component 1108 may be volatile (such as RAM, for example), non-volatile (such as ROM, flash memory, etc., for example) or an intermediate or hybrid type of memory component. This configuration is illustrated in FIG. 11 by dashed line 1104.

In some embodiments, device 1102 may include additional features and/or functionality. For example, device 1102 may include one or more additional storage components 1110, including, but not limited to, a hard disk drive, a solid-state storage device, and/or other removable or non-removable magnetic or optical media. In one embodiment, computer-readable and processor-executable instructions implementing one or more embodiments provided herein are stored in the storage component 1110. The storage component 1110 may also store other data objects, such as components of an operating system, executable binaries comprising one or more applications, programming libraries (e.g., application programming interfaces (APIs), media objects, and documentation. The computer-readable instructions may be loaded in the memory component 1108 for execution by the processor 1106.

The computing device 1102 may also include one or more communication components 1116 that allows the computing device 1102 to communicate with other devices. The one or more communication components 1116 may comprise (e.g.) a modem, a Network Interface Card (NIC), a radiofrequency transmitter/receiver, an infrared port, and a universal serial bus (USB) USB connection. Such communication components 1116 may comprise a wired connection (connecting to a network through a physical cord, cable, or wire) or a wireless connection (communicating wirelessly with a networking device, such as through visible light, infrared, or one or more radiofrequencies.

The computing device 1102 may include one or more input components 1114, such as keyboard, mouse, pen, voice input device, touch input device, infrared cameras, or video input devices, and/or one or more output components 1112, such as one or more displays, speakers, and printers. The input components 1114 and/or output components 1112 may be connected to the computing device 1102 via a wired connection, a wireless connection, or any combination thereof. In one embodiment, an input component 1114 or an output component 1112 from another computing device may be used as input components 1114 and/or output components 1112 for the computing device 1102.

The components of the computing device 1102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of the computing device 1102 may be interconnected by a network. For example, the memory component 1108 may be comprised of multiple physical memory units located in different physical locations interconnected by a network.

Those skilled in the art will realize that storage devices utilized to store computer readable instructions may be distributed across a network. For example, a computing device 1120 accessible via a network 1118 may store computer readable instructions to implement one or more embodiments provided herein. The computing device 1102 may access the computing device 1120 and download a part or all of the computer readable instructions for execution. Alternatively, the computing device 1102 may download pieces of the computer readable instructions, as needed, or some instructions may be executed at the computing device 1102 and some at computing device 1120.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of storing data sets in a storage set provided by at least one storage device, the method involving a computer having a processor and comprising:
    executing, on the processor, instructions that cause the computer to:
        generate on a storage device a journal configured to store data sets respectively associated with a verifier;
        upon receiving a request to store a data set at a location in the storage set:
            compute a verifier for the data set; and
            store the verifier and the data set in the journal;
        select, from the journal, a batch comprising a first data set and a second data set to be committed to the storage set, such that writing the first data set and the second data set to the storage set together is faster than individually writing the first data set and the second data set to the storage set;
        before removing any of the data sets from the journal, for respective data sets of the batch, store the first data set, the verifier of the first data set, the second data set, and the second verifier of the second data set in the storage set; and
        only after storing all of the data sets of the batch in the storage set, remove the first data set and the second data set of the batch from the journal.

2. The method of claim 1:
    the journal comprising a sequence of data sets; and
    storing a data set in the journal comprising: appending the data set to the sequence of data sets.

3. The method of claim 1, wherein selecting the batch further comprises: selecting, from the journal, a first data set and a second data set to be stored in the storage set upon detecting a commit event selected from a commit event set comprising:
    a journal capacity event involving a capacity of the journal;
    a duration event involving a duration of the data sets stored in the journal;
    a commit request event involving a request to commit at least one data set in the journal to the storage set; and
    a storage device workload event involving a workload of at least one storage device of the storage set.

4. The method of claim 1, selecting the batch of data sets comprising:
    selecting for inclusion in the batch a first data set stored in the journal and to be stored at a first location in the storage set; and
    selecting for inclusion in the batch a second data set stored in the journal and to be stored at a second location that is near the first location in the storage set.

5. The method of claim 1, selecting the batch of data sets comprising: omitting from the batch a first data set stored in the journal and to be stored at a location in the storage set when the journal includes a second data set that is newer than the first data set and that is to be stored at the location in the storage set.

6. The method of claim 1:
    respective requests specifying a location in the storage set for the data set; and
    computing the verifier for a data set comprising:
        for a data set that is completely recorded in the journal, computing the verifier from the data set; and
        for a data set that is not completely recorded in the journal:
            reading an original version of the data set at the location in the storage set;
            reading an original verifier of the original version of the data set;
            removing the original version of the data set from the original verifier; and
            including the data set in the original verifier.

7. The method of claim 1, rebuilding the volatile memory representation of the journal comprising:
    for respective data sets stored in the journal, reading a location of the data set in the storage set;
    after reading the locations of the data sets, reading the data sets in the journal; and
    while reading the locations of the data sets, blocking requests from processes to access the storage set.

8. The method of claim 1:
    the computer comprising a volatile memory; and
    the instructions configured to:
        generate in the volatile memory a volatile memory representation of the journal stored on the storage device; and
        upon storing a data set in the journal, store the data set in the volatile memory representation of the journal.

9. The method of claim 8, the volatile memory representation of the journal indexed according to locations in the storage set where the data sets are to be stored.

10. The method of claim 8, the instructions configured to, upon receiving a request to read a data set:
    upon determining that the data set is stored in the volatile memory representation of the journal in the volatile memory, present the data set stored in the volatile memory representation;
    upon determining that the data set is stored in the journal on the storage device, present the data set stored in the journal; and
    upon determining that the data set is stored in the storage set stored on the storage device, present the data set stored in the storage set of the storage device.

11. The method of claim 8, the instructions configured to, after storing a batch to the storage set, remove the batch from the volatile memory representation of the journal.

12. The method of claim 11:
    the instructions configured to:
        upon storing a data set in the journal, store the data set in the volatile memory representation of the journal marked as unremovable; and
        upon storing a data set in the storage set, mark the data set stored in the volatile memory representation of the journal as removable; and
    removing data sets from the volatile memory representation of the journal in the volatile memory comprising: removing from the volatile memory representation of the journal only data sets marked as removable.

13. The method of claim 11:
    the computer comprising a write buffer associated with the journal stored on the storage device;

the instructions configured to:
  detect commits of data sets from the write buffer to the storage set, and
  upon detecting a commit of a data set, mark the data set as committed in the volatile memory representation of the journal; and
removing data sets from the journal comprising: removing from the journal only data sets marked as committed.

14. The method of claim 8:
the volatile memory representation of the journal having a capacity of data sets; and
generating the volatile memory representation of the journal in the volatile memory comprising: reserving capacity in the volatile memory to store:
  the capacity of data sets in the volatile memory representation of the journal;
  the verifiers of the data sets comprising the capacity of the volatile memory representation of the journal; and
  a buffer configured to store data sets to be stored in the storage set while data sets stored in the journal are being stored in the storage set.

15. The method of claim 8, the instructions configured to, upon recovering from a failure of the computer:
using the journal, rebuild the volatile memory representation of the journal in the volatile memory of the computer; and
after rebuilding the volatile memory representation of the journal in the volatile memory, reinitiate selecting batches of data sets stored in the journal to be stored in the storage set.

16. The method of claim 1:
the computer comprising a write buffer associated with the storage device storing the journal; and
the instructions configured to, while writing data sets and verifiers to the journal, bypass the write buffer.

17. The method of claim 1:
the computer comprising a write buffer associated with the storage device storing the journal; and
the instructions configured to, upon flushing the write buffer of the storage device storing the journal, identify a flush point indicating the data sets that have been flushed to the storage device.

18. The method of claim 1:
at least one storage device comprising a write buffer associated with the journal; and
the instructions configured to, after storing the data sets of a batch to the storage set, flush the write buffer of the storage devices.

19. A method of storing data on a storage set comprising at least one storage device, the method involving a computer having a processor and comprising:
sending to the device instructions that, when executed on the processor of the device:
  generate on a storage device a journal comprising a sequence of records, a head pointer, and a tail pointer;
  upon receiving a data set to be stored at a location in the storage set:
    advance the head pointer of the journal past a new record, and
    store the data set in the new record;
  select, from the journal, a batch comprising a first data set and a second data set to be committed to the storage set, such that the first data set and the second data set are near the tail pointer of the journal;
  before removing the first data set and the second data set from the journal, commit the first data set, the verifier for the first data set, the second data set, and the verifier for the second data set to the storage set; and
  after committing the first data set and the second data set to the storage set, advance the tail pointer of the journal past the first data set and the second data set of the batch.

20. A storage controller device that stores data sets in a storage set, the storage controller device comprising:
a storage device;
a processor; and
a memory storing instructions that, when executed by the processor, provide a system comprising:
  a journaling manager that:
    generates on the storage device a journal configured to store data sets; and
    upon receiving a request to store a data set at a location in the storage set, storing the data set in the journal; and
  a batch writer that:
    selects a batch of at least two data sets stored in the journal such that writing the first data set and the second data set to the storage set together is faster than individually writing the first data set and the second data set to the storage set, and wherein the batch excludes a third data set that is between the first data set and the second data set in the journal;
    for respective data sets of the batch, before updating the journal to remove the first data set and the second data set, stores the data set in the storage set; and
    after storing the first data set and the second data set of the batch in the storage set, removes the first data set and the second data set from the journal.

* * * * *